(12) United States Patent
Matsuda

(10) Patent No.: US 8,560,173 B2
(45) Date of Patent: Oct. 15, 2013

(54) SYSTEM AND METHOD FOR CONTROLLING STRADDLE-TYPE VEHICLE

(75) Inventor: Yoshimoto Matsuda, Kobe (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 0 days.

(21) Appl. No.: 13/560,908

(22) Filed: Jul. 27, 2012

(65) Prior Publication Data

US 2013/0030649 A1 Jan. 31, 2013

(30) Foreign Application Priority Data

Jul. 28, 2011 (JP) .................................. 2011-165692

(51) Int. Cl.
*B60G 17/016* (2006.01)
*B60K 28/16* (2006.01)

(52) U.S. Cl.
USPC ............. 701/38; 701/71; 280/5.5; 280/5.502

(58) Field of Classification Search
USPC ................... 701/38, 70, 71, 82, 83; 180/197; 280/5.5, 5.502, 5.506, 5.507; 303/140
See application file for complete search history.

(56) References Cited

U.S. PATENT DOCUMENTS

| 5,044,660 A * | 9/1991 | Yamamura et al. .......... 280/5.52 |
| 5,197,566 A * | 3/1993 | Watanabe et al. ............. 180/249 |
| 2005/0168063 A1 | 8/2005 | Tani et al. |
| 2008/0238188 A1 | 10/2008 | Burkhard et al. |
| 2009/0326779 A1 * | 12/2009 | Oshima et al. .................. 701/86 |
| 2010/0017077 A1 * | 1/2010 | Oshima et al. .................. 701/51 |

FOREIGN PATENT DOCUMENTS

| DE | 102006036383 A1 | 3/2007 |
| EP | 1568561 A1 | 8/2005 |
| EP | 1930233 A2 | 6/2008 |
| JP | 61249889 A | 11/1986 |
| JP | 2008137573 | 6/2008 |

OTHER PUBLICATIONS

ISA European Patent Office, Extended European Search Report of EP12178071, Oct. 1, 2012, WIPO, 6 pages.

* cited by examiner

*Primary Examiner* — Mary Cheung
*Assistant Examiner* — Rodney Butler
(74) *Attorney, Agent, or Firm* — Alleman Hall McCoy Russell & Tuttle, LLP

(57) ABSTRACT

A control system in a straddle-type vehicle is provided. The control system includes front and rear wheels, comprises a load distribution changing section which changes a ground load distribution between the front and rear wheels during driving of the vehicle; a slip suppressing condition determiner section which determines whether or not a suppressing condition used to suppress a slip of one of the front and rear wheels is met, during driving of the vehicle; and a load distribution control section which controls the load distribution changing section to make the ground load of the one of the front and rear wheels greater when the slip suppressing condition determiner section determines that the suppressing condition is met, than when the slip suppressing condition determiner section determines that the suppressing condition is not met.

9 Claims, 13 Drawing Sheets

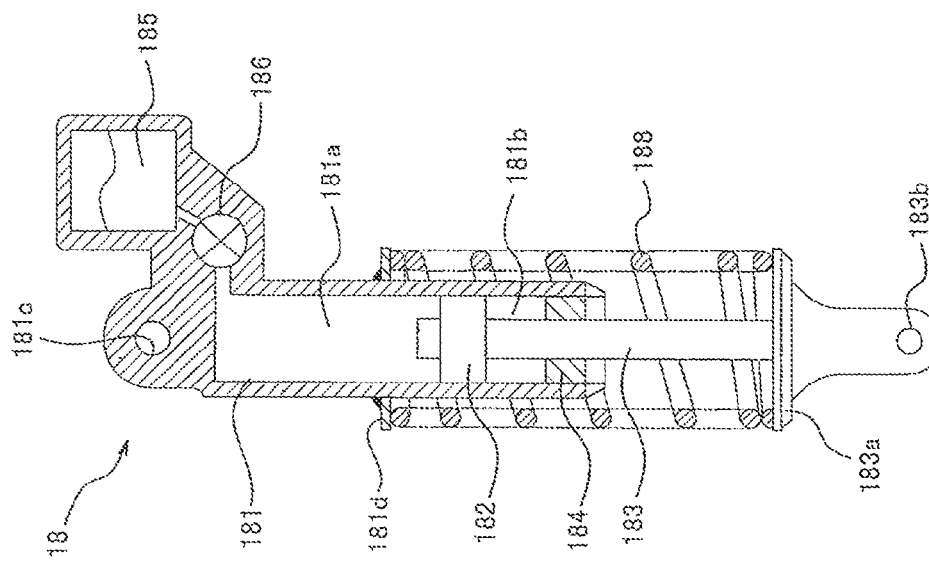
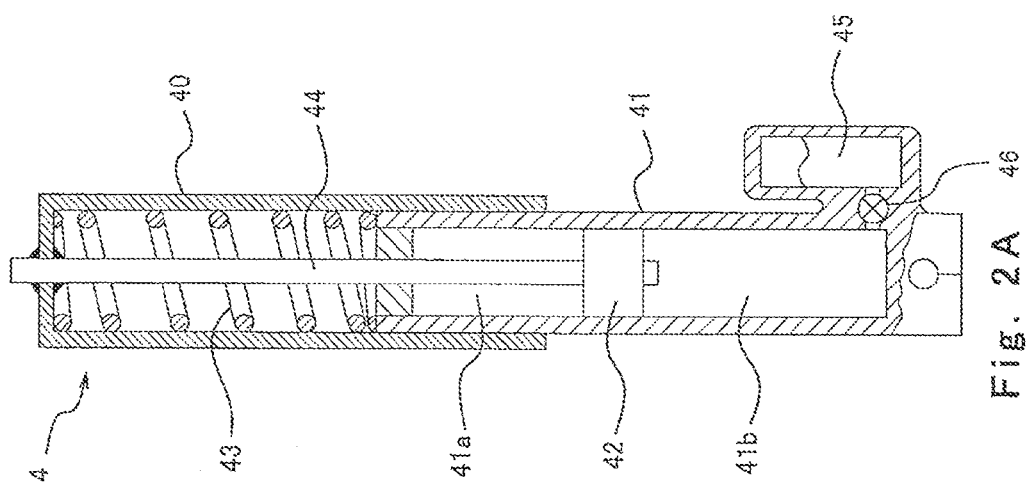
Fig. 2B
Fig. 2A

| ROAD SURFACE CONDITION | SLIP VALUE S | SLIP VALUE CHANGE RATE ΔS |
|---|---|---|
| ROAD SURFACE CONDITION 1 (FRICTION COEFFICIENT: HIGH) | 1 | 1 |
| ROAD SURFACE CONDITION 2 (FRICTION COEFFICIENT: MEDIUM) | 0.2 | 10 |
| ROAD SURFACE CONDITION 3 (FRICTION COEFFICIENT: LOW) | 0.3 | 50 |
| ROAD SURFACE CONDITION 4 (FRICTION COEFFICIENT: VERY LOW) | 0.1 | 300 |

(S, ΔS = AVERAGE VALUE, ROAD SURFACE CONDITION 1 = 1)

SYSTEM AND METHOD FOR CONTROLLING STRADDLE-TYPE VEHICLE

BACKGROUND OF THE INVENTION

1. Field of the Invention

The present invention generally relates to control for straddle-type vehicles. More particularly, the present invention relates to a control technique for preventing a wheel slip from increasing excessively, for example, a wheel spin during acceleration or a wheel lock during braking.

2. Description of the Related Art

Conventionally, in straddle-type vehicles represented by motorcycles, which are lighter in weight than four-wheel vehicles, or the like, a ground load of a wheel (vertical load applied by the wheel), i.e., a pressing force applied by the wheel on a ground surface, is smaller, but its driving power is relatively greater. Therefore, a wheel spin, to be precise, a spin of a drive wheel, tends to occur in the straddle-type vehicle during acceleration. If a driver applies a brake strongly during braking, a wheel may be locked. In that case, the attitude of the motorcycle may become unstable.

As a possible solution to the above, a traction control (hereinafter referred to as TRC control) is known, in which, when a slip of a drive wheel increases during acceleration of a vehicle and a wheel spin is about to occur, a driving power of a driving source such as an engine is reduced to suppress the slip. Also, an anti-lock brake system control (hereinafter referred to as ABS control) is known, if a slip ratio of a wheel increases and the wheel is more likely to be locked during braking, a hydraulic brake pressure is forcibly reduced to suppress the wheel sip.

In addition, the center of gravity of a straddle-type vehicle, including a passenger straddling a seat, is relatively high. Therefore, a load may shift to a greater degree in a forward and rearward direction (this load shifting is referred to as pitching motion), during acceleration or braking. To address this, a technique of a suspension control is known, in which the damping force of a suspension is adjusted to suppress a rapid change in the attitude of the vehicle, due to the load shifting.

Specifically, Japanese Laid-Open Patent Application Publication No. 61-249889 discloses a technique in which the damping force of a damper is increased when a deceleration is high in a motorcycle, to suppress diving (nose diving) of the front portion of a vehicle body. Japanese Laid-Open Patent Application Publication No. 2008-137573 discloses a technique in which the damping force corresponding to extension of a front wheel and the damping force corresponding to diving of a rear wheel are increased, to suppress a squat motion of a vehicle body, during abrupt starting, etc.

However, the known TRC control or ABS control reduces a force to be applied in a rotational direction to the wheel in response to the driver's operation of an accelerator or a brake, i.e., a driving force or a braking force. Therefore, there may be a chance that a desired driving power performance is not attained, or a baking distance of the vehicle increases.

The above stated suspension control can stabilize the attitude of the vehicle effectively, but cannot enhance the driving power performance and cannot reduce the braking distance. Because of this, even if the suspension control is used in combination with the TRC control or the ABS control, the above stated problems associated with the TRC control and the ABS control cannot be resolved.

SUMMARY OF THE INVENTION

In view of the characteristic of a straddle-type vehicle in which its load shifts quickly to a great degree during acceleration or braking, the present invention has been made. An object of the present invention is to actively change a ground load distribution between front and rear wheels by utilizing the load shifting, to suppress a slip of the wheel, and hence improve driving power performance and braking performance of the straddle-type vehicle.

According to one aspect of the present invention, a control system in a straddle-type vehicle including front and rear wheels, comprises a load distribution changing section which changes a ground load distribution between the front and rear wheels during driving of the vehicle; a slip suppressing condition determiner section which determines whether or not a suppressing condition used to suppress a slip of one of the front and rear wheels is met, during driving of the vehicle; and a load distribution control section which controls the load distribution changing section to make the ground load of the one of the front and rear wheels greater, when the slip suppressing condition determiner section determines that the suppressing condition is met, than when the slip suppressing condition determiner section determines that the suppressing condition is not met.

In accordance with this configuration, if the slip suppressing condition determiner section determines that the suppressing condition used to suppress a slip of one of the front and rear wheels is met during driving of the vehicle, the load distribution control section controls the load distribution changing section to increase the ground load of that wheel. Because of the increased ground load, a gripping force generated in the wheel increases, and a slip can be suppressed.

Therefore, the slip can be suppressed without reducing a driving power or a braking force applied to the wheel. As a result, a driving power performance or a braking performance of the straddle-type vehicle can be improved. When this control (ADC control) is used in combination with a conventional slip control such as TRC control or ABS control, the degree to which the driving power or braking force is reduced by this slip control (TRC control or ABS control) can be lessened, or the frequency with which the slip control takes place can be reduced.

The load distribution changing section may be an attitude changing section which changes an attitude of the vehicle around a pitching axis during driving of the vehicle; and the load distribution control section may control the attitude changing section to change the attitude of the vehicle in a direction to increase the ground load of the one of the front and rear wheels. For example, if the load is caused to shift in a rearward direction to a greater degree in correspondence with a change in the attitude during acceleration, the ground load of the rear wheel increases, while if the load is caused to shift in a forward direction to a greater degree in correspondence with a change in the attitude during braking, the ground load of the front wheel increases.

When buffer devices are provided to correspond to the front and rear wheels, respectively, the attitude changing section changes the characteristics of the buffer devices to change the attitude of the vehicle. The characteristic of the buffer device may include, for example, a spring force, a damping force, or a stroke (vertical distance between the vehicle and the wheel). By changing the spring force or the damping force, the attitude of the vehicle body of the vehicle can be changed to increase the ground load of one of the front and rear wheels, by utilizing load shifting due to an inertia force during acceleration or braking of the vehicle. Specifically, the damping force, the spring force or the like of the buffer device of one of the front and rear wheels may be made smaller, and the damping force, the spring force or the like of the buffer device of the other of the front and rear wheels may be increased. Or, the stroke of the buffer device may be adjusted.

The slip suppressing condition determiner section may determine that the suppressing condition is met based on a slip state of the one of the front and rear wheels during acceleration or braking of the vehicle; and the load distribution control section may change the characteristic of the buffer device corresponding to one of the front and rear wheels to cause the buffer device to be contracted more easily or to cause the buffer device corresponding to the other of the front and rear wheels to be contracted less easily, when the slip suppressing condition determiner section determines that the suppressing condition is met, than when the slip suppressing condition determiner section determines that the suppressing condition is not met. To allow the buffer device to be contracted more easily, the spring force or the damping force may be reduced. To allow the buffer device to be contracted less easily, the spring force or the damping force may be increased.

The load distribution control section may change the characteristic of the buffer device corresponding to at least a drive wheel of the front and rear wheels. The load distribution control section may change how to change the characteristic of the buffer device based on a driving state of the vehicle. For example, the characteristic of the buffer device is preferably changed so that the load shifting occurs to a proper degree in view of the fact that the inertia force is greater and the load shifts to the front wheel to a greater degree during braking, as a driving speed is higher. In the case of the motorcycle, how to change the characteristic of the buffer device may be changed according to a bank state of a vehicle body when the vehicle is turning.

When the control system includes a slip control section which adjusts a force applied in a rotational direction to each of the front and rear wheels during acceleration or braking of the straddle-type vehicle to suppress a slip of the wheel, like known TRC control or ABS control, the slip suppressing condition determiner section may determine that the suppressing condition is met, in association with control executed by the slip control section.

For example, when the slip control such as the TRC control or the ABS control is initiated for one of the front and rear wheels, the ground load of this wheel is increased at the same time, to suppress the slip. This could enable the slip control to work more effectively, and lessen the degree to which the driving power or the braking force is reduced by the slip control. If it is predicted that the slip control is going to be initiated and the ground load of the wheel is increased prior to the initiation of the slip control, the frequency with which the slip control takes place can be reduced.

The slip suppressing condition determiner section may determine that the suppressing condition is met, when the straddle-type vehicle is driving in a predetermined driving state. The predetermined driving state is defined as a state from which it is predicted that a slip of the wheel will occur. The predetermined driving state may be, for example, a rapid acceleration state or rapid braking state of the vehicle or a state in which the vehicle is driving a road surface with a low friction coefficient on which its tire cannot generate a sufficient gripping force, such as a snowy road surface or a muddy road surface. Or, the predetermined driving state may be a state in which a brake of a vehicle is actuated by the driver or a switch is operated by the driver.

When the ground load distribution control (ADC control) is used in combination with the slip control such as the TRC control or the ABS control, the load distribution control section and the slip control section may be constituted by separate control units, respectively, in view of a processing burden of computers. This makes it easy to ensure responsiveness of each of the slip control and the ground load distribution control.

According to another aspect of the present invention, there is provided a method of controlling a straddle-type vehicle including a load distribution changing section which changes a ground load distribution between front and rear wheels during driving of the straddle-type vehicle, comprising: during driving of the vehicle, controlling the load distribution changing section to make a ground load of one of the front and rear wheels greater, when it is determined that a suppressing condition used to suppress a slip of the one of the front and rear wheels is met, than when it is determined that the suppressing condition is not met.

The above and further objects, features and advantages of the invention will more fully be apparent from the following detailed description with reference to the accompanying drawings.

BRIEF DESCRIPTION OF THE DRAWINGS

FIG. 2A is a schematic view showing a structure of a front fork.

FIG. 2B is a schematic view showing a structure of a cushion unit.

DETAILED DESCRIPTION OF THE PREFERRED EMBODIMENTS

Now, embodiments of the present invention will be described with reference to the drawings. Throughout the drawings, the same or corresponding components are designated by the same reference symbols. The stated directions are referenced from the perspective of a driver riding in the motorcycle.

Embodiment 1

Figure 1:
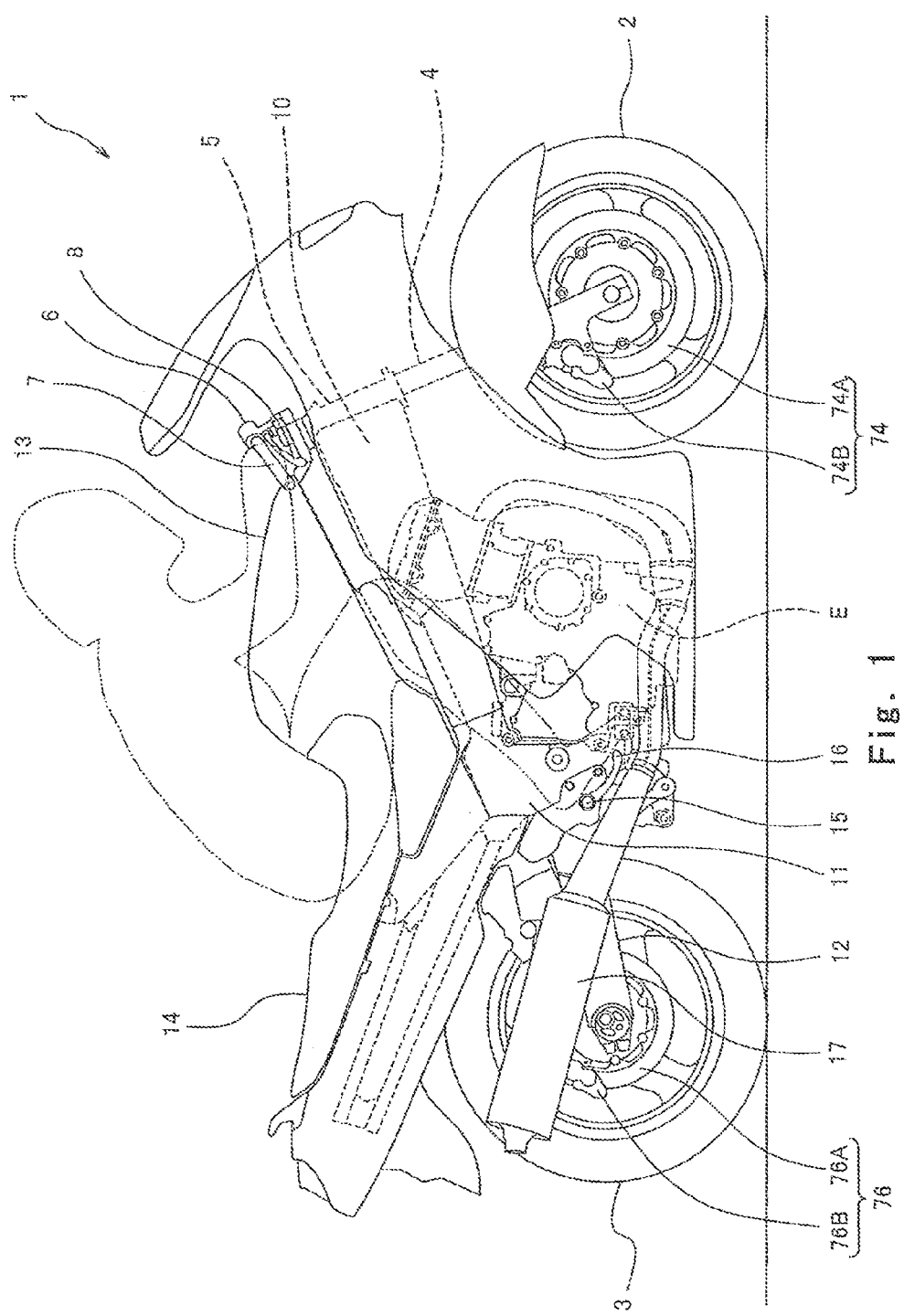
FIG. 1 is a right side view of a motorcycle according to an embodiment of the present invention.

FIG. 1 is a right side view of a motorcycle 1 according to an embodiment of the present invention. Referring to FIG. 1, the motorcycle 1 includes a front wheel 2 which is a driven wheel and a rear wheel 3 which is a drive wheel. The front wheel 2 is rotatably mounted to lower end portions of a pair of right and left front forks 4 extending substantially vertically. The upper portions of the right and left front forks 4 are coupled together via a pair of upper and lower brackets (not shown), and rotatably supported by a head pipe 5 provided on a vehicle body. A bar-type steering handle 6 extending in a rightward and leftward direction is attached to the upper bracket. The driver grips and manipulates the steering handle 6 to actuate the front forks 4 and the front wheel 2 around the head pipe 5.

A throttle grip 7 which can be gripped by the driver's right hand is provided at a right end of the steering handle 6. The driver rotates the throttle grip 7 by twisting the driver's wrist to move a main throttle valve 21 (see FIG. 3) as described later. A brake lever 8 is provided forward relative to the throttle grip 7 to actuate a front wheel brake 74. A clutch lever 9 (see FIG. 3) is attached to a left end of the steering handle 6 in a location forward relative to a grip which can be gripped by the driver's left hand, to actuate a clutch 28 (see FIG. 3) as described later.

As schematically shown in FIG. 2A, for example, the front fork 4 has a telescopic configuration including an outer tube 40 and an inner tube 41. The front fork 4 is a buffer device which is provided with a coil spring 43 mounted inside thereof and is integral with an oil damper. Specifically, a piston 42 is slidably accommodated in the inner tube 41, thereby defining an operating chamber (extension operating chamber) 41a corresponding to extension of the front fork 4 and an operating chamber (contraction operating chamber) 41b corresponding to contraction (retraction) of the front fork 4. The piston 42 is secured to the lower end of a rod 44 extending in an axial direction of the inner tube 41. The upper end of the rod 44 is secured to the bottom portion of the outer tube 40.

The operating chambers 41a, 41b are filled with oil. Although not shown in detail, the piston 42 is provided with an extension one-way valve corresponding to extension of the front fork 4 and a contraction one-way valve corresponding to a contraction of the front fork 4, to allow oil to flow between the operating chambers 41a, 41b. A valve unit 46 is provided between the contraction operating chamber 41b and a reservoir 45. In an exemplary configuration, the valve unit 46 includes an extension one-way valve and a contraction one-way valve, and a control valve for adjusting the opening degree of each of communicating passages which bypass these one-way valves. The opening degree of the control valve is changed by an electromagnetic actuator (not shown) to increase or decrease a flow resistance of the oil, thereby changing a damping force.

Turning back to FIG. 1, a front wheel brake caliper 74B is mounted to a lower end portion of the front fork 4 configured as described above such that the brake caliper 74B seizes a front wheel brake disc 74A rotatable together with the front wheel 2. The front wheel brake caliper 74B and the front brake wheel disc 74A constitute a front wheel brake 74. The front brake caliper 74B includes a piston (not shown) pressed against the front wheel brake disc 74A by a hydraulic pressure. A hydraulic brake system 60 for feeding the hydraulic pressure (brake pressure) to the front wheel brake caliper 74B will be described later with reference to FIG. 6.

A pair of right and left main frames 10 extend rearward from the head pipe 5 such that the main frames 10 are tilted slightly in a downward direction. Pivot frames 11 extending downward are coupled to rear portions of the main frames 10, respectively. Swing arms 12 extending in a substantially forward and rearward direction are coupled at front end portions thereof to the pivot frames 11, respectively, such that the swing arms 12 are pivotable around the front end portions. The rear wheel 3 is rotatably mounted to rear end portions of the swing arms 12. A rear wheel brake caliper 76B is mounted to rear end portions of the swing arms 12 such that the rear wheel brake caliper 76B seizes a rear wheel brake disc 76A as in the front wheel brake 74. The rear wheel brake caliper 76B and the rear wheel brake disc 76A constitute a rear wheel brake 76.

A cushion unit 18 (see FIG. 2B) is mounted to a portion of the swing arm 12, for example, a portion forward relative to a center in the forward and rearward direction, via a link or the like. The cushion unit 18 is a buffer device at the rear wheel 3 side to generate a spring force and a damping force according to the pivot (swing) motion of the swing arm 12. As shown in FIG. 2B, the cushion unit 18 includes a cylinder 181 filled with the oil, a piston 182 slidably accommodated in the cylinder 181, and a rod 183 pivotally fitted to the lower end portion of the cylinder 181 via a seal 184.

Like the piston 42 of the front fork 4, the piston 182 defines an extension operating chamber 181a corresponding to extension of the cushion unit 18 and a contraction operating chamber 181b corresponding to a contraction of the cushion unit 18, and is provided with an extension one-way valve and a contraction one-way valve through which the oil flows. Like the front fork 4, a valve unit 186 is provided between the contraction operating chamber 181b and a reservoir 185 and includes a control valve. The opening degree of the control valve of the valve unit 186 is changed by an electromagnetic actuator (not shown) to increase or decrease a flow resistance of the oil, thereby changing a damping force.

In the exemplary configuration shown in FIG. 2B, a pillow ball 181c is provided at the upper end of the cylinder 181 and coupled to the vehicle body, while a lower spring receiver 183a and a pillow ball 183b coupled to the swing arm 12 are provided at the lower end of the rod 183. A cushion spring 188 is mounted in a pre-compressed state between an upper spring receiver 181d provided in the vicinity of a center of the cylinder 181 in its lengthwise direction and the lower spring receiver 183a.

Turning back to FIG. 1 again, a fuel tank 13 is positioned on upper portions of the main frames 10 in a range from a region near the head pipe 5 to a rearward region. A seat 14 which can be straddled by the driver is positioned behind the fuel tank 13. Below the seat 14, steps 15 are provided at right and left sides to allow the driver's feet to rest thereon. A brake pedal 16 extends forward from the underside portion of the right step 15. The rear end portion of the brake pedal 16 is coupled to a step stay, or the like such that the brake pedal 16 is pivotable around the rear end portion. The driver depresses (presses down) the brake pedal 16 to primarily actuate the rear wheel brake 76.

Figure 3:
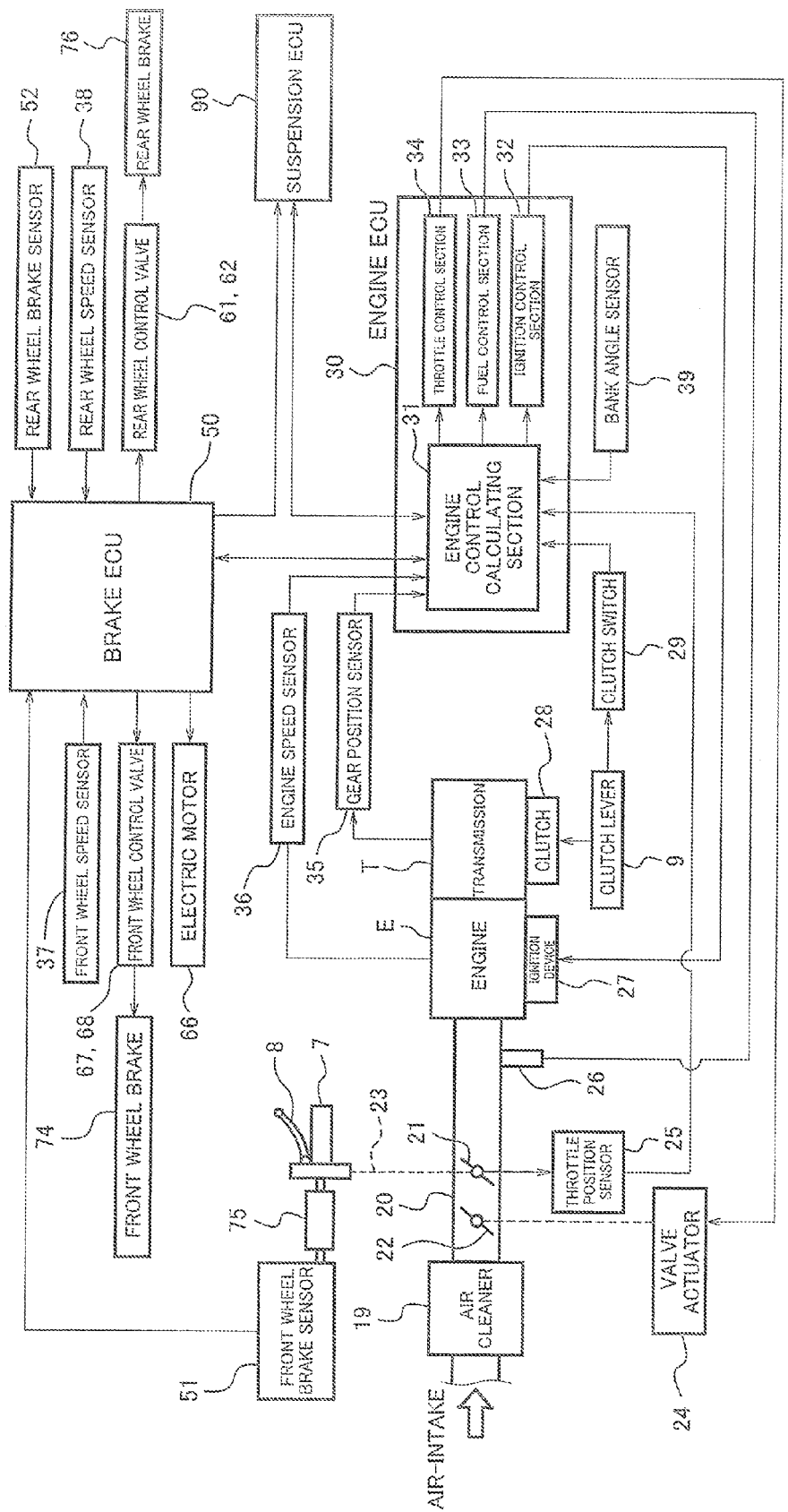
FIG. 3 is a block diagram of a control system of an engine and a control system of a brake in the motorcycle.

An engine E is positioned below the main frames 10 and mounted to the main frames 10 and the pivot frames 11. For example, the engine E is an inline four-cylinder engine. An air-intake system, which will be described later with reference to FIG. 3, is coupled to a rear side of the engine E. An exhaust system is coupled to a front side of the engine E to collect exhaust gas from the cylinders and guide the exhaust gas to a silencer 17. A driving power (rotational force) of the engine E is transmitted from a transmission T (see FIG. 3) attached integrally with a crankcase to the rear wheel 3 via a driving power transmission member such as a chain.

Control System of Engine, etc.

FIG. 3 is a block diagram of a control system of the engine E, and others in the motorcycle 1. Turning to FIG. 3, in the air-intake system of the engine E, an air-intake pipe 20 extending to a downstream side in an air flow direction, from an air cleaner 19, is provided with a main throttle valve 21 and a sub-throttle valve 22. The main throttle valve 21 is coupled to the throttle grip 7 via a throttle wire 23. The main throttle valve 21 is opened and closed in response to the driver's operation of the throttle grip 7. A throttle position sensor 25 detects the opening degree of the main throttle valve 21.

The sub-throttle valve 22 is positioned upstream of the main throttle valve 21 and coupled to a valve actuator 24 constituted by, for example, an electric motor. The valve actuator 24 is actuated in response to a signal from an engine ECU 30 to continuously change a passage cross-sectional area of the air-intake pipe 20. A plurality of injectors 26 are provided to inject a fuel to a region downstream of the main throttle valve 21. The fuel injected from each of these injectors 26 is mixed with air in a corresponding one of the cylinders of the engine E, to form an air-fuel mixture. Ignition devices 27 each including an ignition plug and an ignition circuit are provided to respectively correspond to the cylinders, to ignite the air-fuel mixture.

The transmission T is attached integrally with the engine E as described above and provided with a clutch 28. The clutch 28 is engaged to permit the driving power from a crankshaft to be transmitted to the rear wheel 3 or disengaged to inhibit the driving power from being transmitted to the rear wheel 3. A clutch lever 9 is mechanically coupled to the clutch 28 via a wire or the like. When the driver grips the clutch lever 9, the clutch 28 is disengaged to inhibit the driving power from being transmitted to the rear wheel 3, while when the driver releases the clutch lever 9, the clutch 28 is engaged to permit the driving power to be transmitted to the rear wheel 3. The clutch lever 9 is attached with a clutch switch 29 configured to detect whether or not the clutch lever 9 has been operated (gripped).

Although not shown, the transmission T includes an input shaft and an output shaft which extend in parallel. A gear train of the input shaft and a gear train of the output shaft are configured to mesh with each other. The transmission T is configured to change a combination of a gear of the input shaft and a gear of the output shaft to change a transmission gear position in a state in which the clutch 28 is disengaged to inhibit the engine driving power from being transmitted to the rear wheel 3. The transmission T is attached with a gear position sensor 35 for detecting the transmission gear position. The gear position sensor 35 outputs a detection signal to the engine ECU 30. The engine E is attached with an engine speed sensor 36. The engine speed sensor 36 is configured to pick up a rotational angle of the crankshaft to detect its angular velocity (crank angular velocity $\omega$), i.e., engine speed.

A signal from the throttle position sensor 25, a signal from the clutch switch 29, a signal from the gear position sensor 35, a signal from the engine speed sensor 36, etc., are input to the engine ECU 30 including a processor such as a microcomputer or memories. As described later, a signal from the front wheel speed sensor 37, a signal from the rear wheel speed sensor 38, a signal from a bank angle sensor 39 for detecting a bank angle of the motorcycle 1 (hereinafter will be referred to as a bank angle $\beta$) are also input to the engine ECU 30.

The engine ECU 30 of the present embodiment includes an engine control calculating section 31 for calculating an air-intake amount, a fuel injection amount, an ignition timing, etc., used to control the operation of the engine E based on the signals received from the sensors 25, 35, 36, 37 to 39 and the switch 29. In addition, the engine ECU 30 includes an ignition control section 32 for controlling the ignition devices 27, a fuel control section 33 for controlling the injectors 26, and a throttle control section 34 for controlling the valve actuator 24 of the sub-throttle valve 22, based on data calculated in the engine control calculating section 31.

TRC Control

Figure 4:
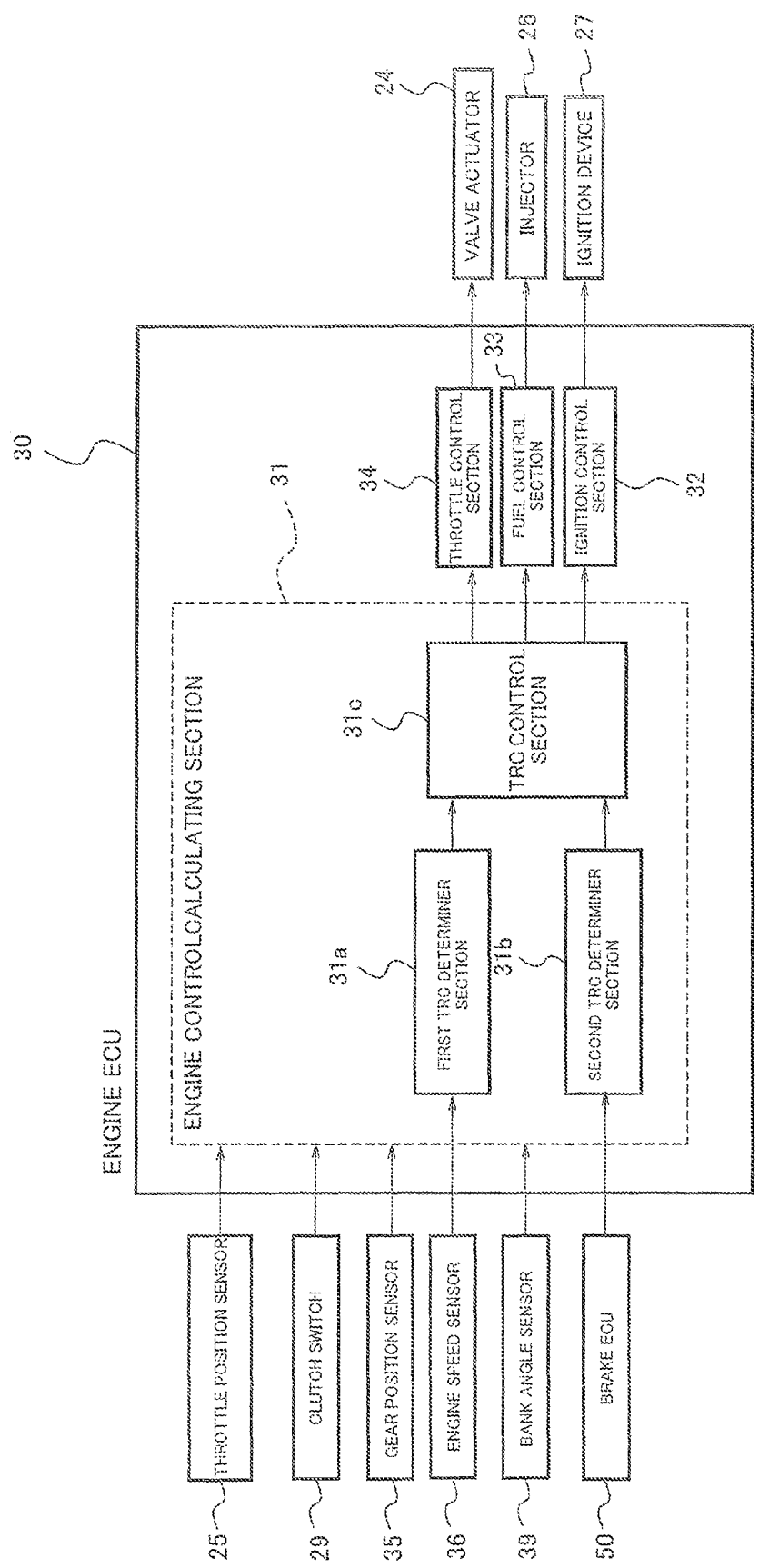
FIG. 4 is a block diagram showing major components in a TRC control system.

In the present embodiment, the engine ECU 30 performs a traction control (TRC control) for controlling the driving power of the engine E (engine driving power), according to a slip state of the rear wheel 3 which is the drive wheel. FIG. 4 is a block diagram showing major components in a TRC control system of the present embodiment. In an exemplary configuration, the engine control calculating section 31 includes a first TRC determiner section 31a and a second TRC determiner section 31b each of which is configured to determine that an initiation condition used to initiate the TRC control is met, and a TRC control section 31c configured to reduce the engine driving power, by performing at least one of the ignition control, the fuel injection control, and the throttle control, if one of the first TRC determiner section 31a and the second TRC determiner section 31b determines that the initiation condition is met.

The first TRC determiner section 31a receives a signal from the engine speed sensor 36, and determines that the rear wheel 3 is more likely to slip undesirably on a road surface and the engine driving power should be reduced to suppress the slip, i.e., a first initiation condition of the TRC control is met, when an increase rate of the engine speed, i.e., an increase rate $\Delta\omega$ of the crank angular velocity $\omega$ per unit time increases and becomes equal to or greater than a predetermined threshold.

The increase rate $\Delta\omega$ of the crank angular velocity $\omega$ per unit time is defined as an increase amount of the rotational speed (crank angular velocity $\omega$) of the crankshaft within a predetermined period of time, and is, for example, a difference in the crank angular velocity $\omega$ per predetermined time, in the present embodiment. The difference may be calculated using two values adjacent in time or two values which are not adjacent in time, among values of the crank angular velocity $\omega$ which are sampled at predetermined sampling periods by the engine speed sensor 36. Alternatively, a moving average may be employed.

The second TRC determiner section 31b receives the signals from the front wheel speed sensor 37 (see FIG. 3) and the rear wheel speed sensor 38 (see FIG. 3) as inputs, and determines that a condition used to reduce the engine driving power, i.e., a second initiation condition used to initiate the TRC control is met, if the rear wheel speed Vr becomes greater than the front wheel speed Vf, by a predetermined threshold or more during acceleration. It may be supposed that the front wheel 2 which is a driven wheel is not virtually slipping, during acceleration. Therefore, it may be supposed that a value derived by dividing by the rear wheel speed Vr, a difference between the rear wheel speed Vr and the front wheel speed Vf (Vr−Vf), i.e., (Vr−Vf)/Vr is a slip ratio of the rear wheel 3. In other words, the second TRC determiner section 31*b* determines a timing at which the TRC control should be initiated, based on the slip ratio of the rear wheel 3 which is the drive wheel.

The TRC control section 31*c* performs the TRC control for reducing the driving power applied to the rear wheel 3 based on the result of determination made by either the first TRC determiner section 31*a* or the second TRC determiner section 31*b*. For example, the TRC control section 31*c* calculates a retard amount of ignition timing, a reduction amount of fuel injection, and a reduction amount of air-intake, and outputs command values corresponding to the retard amount of ignition timing, the reduction amount of fuel injection, and the reduction amount of air-intake, to the ignition control section 32, the fuel control section 33, and the throttle control section 34, respectively, thereby reducing the engine driving power applied to the rear wheel 3 quickly. Or, the engine driving power can be reduced quickly by pausing ignition in any of the cylinders. Or, the engine driving power can be reduced by applying a braking force to the rear wheel 3 by utilizing a hydraulic control system of the ABS (anti-lock brake system), as will be described below.

Each of the first TRC determiner section 31*a*, the second TRC determiner section 31*b* and the TRC control section 31*c* is implemented by executing software programs in CPU of the engine ECU 30. The first TRC determiner section 31*a*, the second TRC determiner section 31*b* and the TRC control section 31*c* correspond to a slip control section which adjusts the engine driving power (force in the rotational direction) applied to the rear wheel 3 to suppress a wheel slip during acceleration of the motorcycle 1.

Brake Control System

The motorcycle 1 of the present embodiment includes a brake control system which operates as a known anti-lock brake system (ABS). Referring to FIG. 3, the brake ECU 50 including a processor unit such as a microcomputer, memories, and others, is coupled with a front wheel hydraulic brake pressure sensor (hereinafter referred to as front wheel brake pressure sensor) 51 for detecting a front wheel brake pressure generated by operation of the brake lever 8, a rear wheel hydraulic brake pressure sensor (hereinafter referred to as rear wheel brake pressure sensor) 52 for detecting a rear wheel brake pressure generated by depression of the brake pedal 16, the front wheel speed sensor 37 for detecting the front wheel speed Vf from a rotational speed of the front wheel 2, and the rear wheel speed sensor 38 for detecting the rear wheel speed Vr from a rotational speed of the rear wheel 3.

The brake pressure may be a caliper pressure or a master pressure. Instead of the brake pressure, a displacement amount of the brake lever 8 or the brake pedal 16, a displacement amount of a brake pad may be used as a braking force. The wheel speed is derived by multiplying a rotational angle speed of the wheel by a peripheral length of the wheel.

In the present embodiment, the brake ECU 50 controls control valves 61, 62, 67 and 68 and an electric motor 66 of hydraulic pumps 63 and 69 in a hydraulic brake pressure system 60 as will be described in detail later with reference to FIG. 6. If it is determined that the slip ratio of each of the front wheel 2 and the rear wheel 3 increases, during braking, each of the front wheel 2 and the rear wheel 3 is more likely to be locked, and therefore the braking force applied to the wheel should be reduced to suppress the lock, based on the signals from the sensors 37, 38, 51, and 52, and the engine ECU 30, the brake ECU 50 controls the hydraulic brake pressure system 60 to decrease a brake pressure of the brake 74 of the front wheel 2 and a brake pressure of the brake 76 of the rear wheel 3, to decrease a braking force applied to the front wheel 2 and a braking force applied to the rear wheel 3, respectively.

Figure 5:
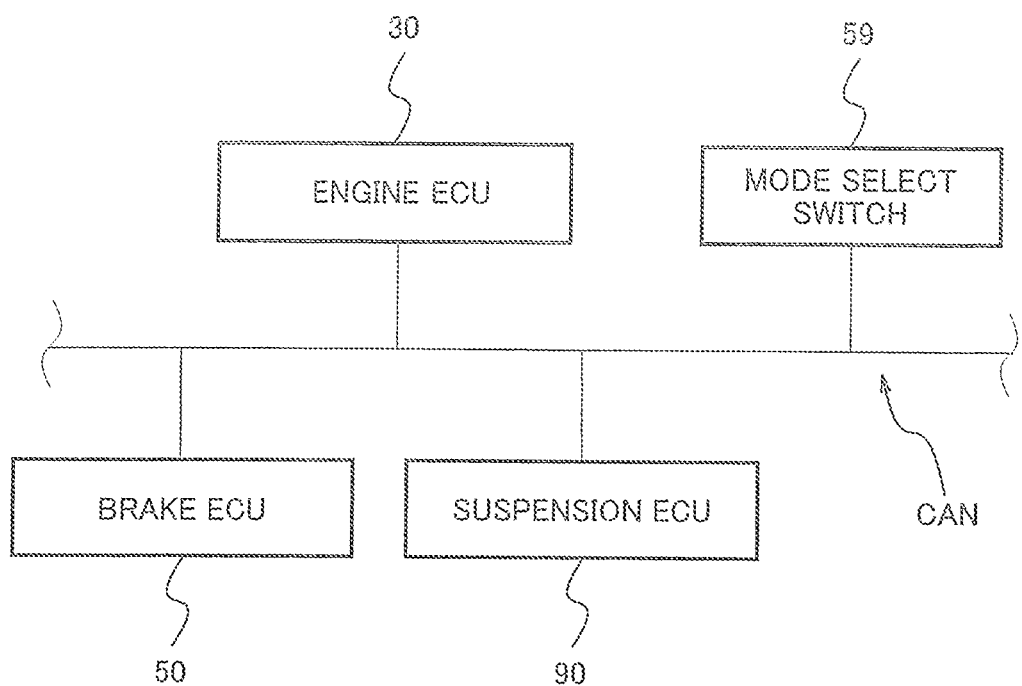
FIG. 5 is a block diagram showing an exemplary integrated control system in which an engine ECU, a brake ECU, and a suspension ECU are coupled together via CAN.

As schematically shown in FIG. 5, the brake ECU 50 is coupled to the engine ECU 30 to enable signal transmission and reception with the engine ECU 30 via a CAN (controller area network) which allows multiple communications. As will be described in detail later, a suspension ECU 90 for controlling the front fork 4 or the cushion unit 18 in the motorcycle 1 such that its damping force is variably adjustable is coupled to the CAN. In the present embodiment, for example, the engine ECU 30 serves as a master controller for providing commands to the brake ECU 50 and to the suspension ECU 90 which are slave controllers. Thus, these ECUs 30, 50 and 90 constructs an integrated control system.

A mode select switch 59 is also coupled to the CAN and operated by the driver. The mode select switch 59 may be a traction control mode switch for adjusting the initiation condition for the TRC control or adjusting a degree to which the TRC control works effectively, or a switch for selecting a driving mode such as a sport driving mode or a town driving mode. Although not shown, a controller of an electronically controlled steering damper may be coupled to the CAN.

Returning to FIGS. 3 and 4, the sensors 25, 35, and 36, the switch 29, the actuator 24 of the sub-throttle valve 22, the injectors 26, and the ignition devices 27, which are associated with the engine control, the sensors 37, 38, 51, and 52 associated with the ABS control, an actuator in the hydraulic brake pressure system 60, etc., may be coupled to the engine ECU 30 and to the brake ECU 50 via the CAN.

Hydraulic Brake Pressure System

Figure 6:
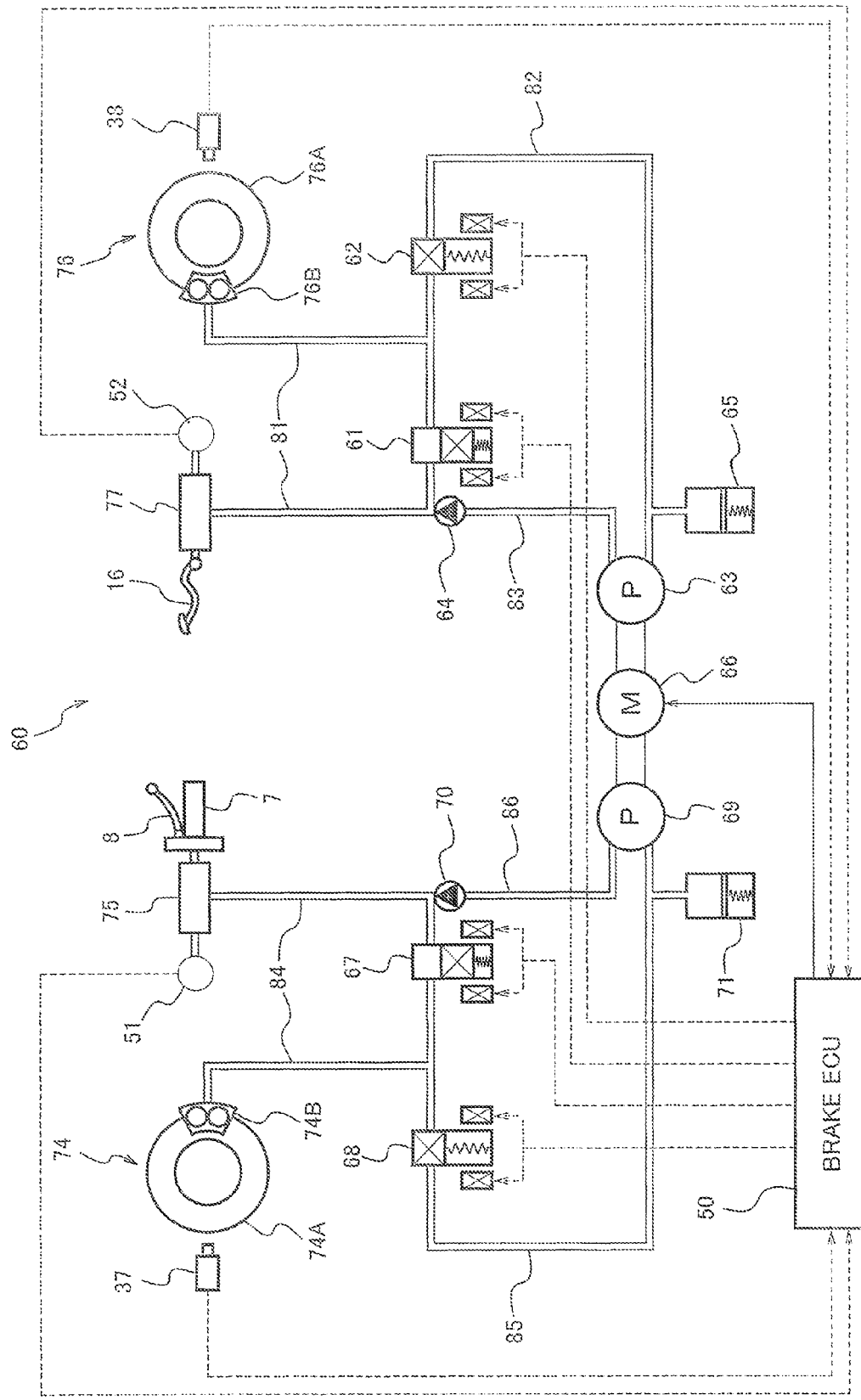
FIG. 6 is a view of a hydraulic system of a brake control system of the motorcycle.

FIG. 6 is a view of the hydraulic brake pressure system 60 of the present embodiment. At the left side of FIG. 6, a front wheel hydraulic brake pressure system is shown, in which a brake pressure is fed to the caliper 74B of the front wheel brake 74 by the driver's operation of the brake lever 8 to apply a braking force to the front wheel 2. Likewise, at the right side of FIG. 6, a rear wheel hydraulic brake pressure system is shown, in which the brake pressure is fed to the caliper 76B of the rear wheel brake 76 by the driver's depressing operation of the brake pedal 16 to apply the braking force to the rear wheel 3. The front wheel hydraulic brake pressure system is fundamentally identical in configuration to the rear wheel hydraulic brake pressure system, and therefore, the rear wheel hydraulic brake pressure system will be described hereinafter.

In the rear wheel hydraulic brake pressure system, the brake pedal 16 is coupled to a rear wheel brake master cylinder 77. According to a displacement amount of the brake pedal 16 which is depressed by the driver, the rear wheel brake master cylinder 77 generates a brake pressure (master pressure). This brake pressure is fed to a piston of the rear wheel brake caliper 76B via a rear wheel main passage 81. The rear wheel first control valve 61 is provided in the rear wheel main passage 81. The rear wheel first control valve 61 is opened and closed in response to a command signal from the brake ECU 50, to provide communication or discommunication of the rear wheel main passage 81.

A rear wheel pressure decrease passage 82 branches from the rear wheel main passage 81, in a location between the rear wheel first control valve 61 and the rear wheel brake caliper 76. A downstream end of the rear wheel pressure decrease passage 82 is coupled to a suction side of the rear wheel hydraulic pump 63, and the rear wheel second control valve 62 and the rear wheel reservoir 65 are provided on the rear wheel pressure decrease passage 82. The rear wheel second control valve 62 is opened and closed in response to a command signal from the brake ECU 50, to provide communication or discommunication of the rear wheel pressure decrease passage 82.

For example, the rear wheel first control valve 61 is an electromagnetic valve which is open in a normal state and has two-ports corresponding to two-positions, while the rear wheel second control valve 62 is an electromagnetic valve which is closed in a normal state and has two-ports corresponding to two-positions. According to the driver's depressing operation of the brake pedal 16, the brake pressure (master pressure) generated in the rear wheel brake master cylinder 77 is fed to the rear wheel brake caliper 76B via the rear wheel first control valve 61 in an open position. In this way, a braking force corresponding to the driver's depressing operation of the brake pedal 16 is applied to the rear wheel 3.

Upon initiation of the ABS control, the rear wheel first control valve 61 and the rear wheel second control valve 62 are duty-controlled in accordance with the command signals from the brake ECU 50 so that the brake pressure (caliper pressure) of the rear wheel brake caliper 76B is maintained or decreased. As a result, the braking force applied to the rear wheel 3 is adjusted. If the rear wheel first control valve 61 is closed in a state where the rear wheel second control valve 62 is closed, the caliper pressure of the rear wheel brake 76 can be maintained. If the rear wheel second control valve 62 is opened to provide communication between the rear wheel brake caliper 76B and the rear wheel reservoir 65, the caliper pressure can be decreased.

A rear wheel pressure increase passage 83 is coupled to an outlet of the rear wheel hydraulic pump 63. A downstream end of the rear wheel pressure increase passage 83 is coupled to the rear wheel main passage 81 in a location between the rear wheel brake master cylinder 77 and the rear wheel first control valve 61. A rear wheel one-way valve 64 is provided on the rear wheel pressure increase passage 83. When the electric motor 66 is actuated in response to the command signal from the brake ECU 50, the rear wheel hydraulic pump 63 is actuated to increase the brake pressure in the rear wheel pressure increase passage 83. Thereby, the caliper pressure of the rear wheel brake 76 can be increased.

Like the rear wheel hydraulic brake pressure system, the front wheel hydraulic brake pressure system depicted at the left side of FIG. 6, includes a front wheel brake master cylinder 75 for generating a brake pressure (master pressure) according to the driver's operation of the brake lever 8, a front wheel main passage 84 for feeding the brake pressure to the front wheel brake caliper 74B, a front wheel pressure decrease passage 85 which branches from a location of the front wheel main passage 84 and extends to a suction side of the front wheel hydraulic pump 69, and a front wheel pressure increase hydraulic passage 86 coupling an outlet of the front wheel hydraulic pump 69 to the front wheel main passage 83.

The front wheel first control valve 67, the front wheel second control valve 68 and the front wheel one-way valve 70 are provided on the front wheel main passage 84, the front wheel pressure decrease passage 85, and the front wheel pressure increase passage 86, respectively. In response to the command signal from the ECU 50, the front wheel hydraulic pump 69 is actuated, and the front wheel first control valve 67 and the front wheel second control valve 68 are duty-controlled. Thereby, the brake pressure (caliper pressure) of the front wheel brake caliper 74B is maintained, reduced or increased, thereby adjusting a braking force applied to the front wheel 2. A front wheel reservoir 71 is coupled to the front wheel pressure decrease passage 85 between the front wheel second control valve 68 and the front wheel hydraulic pump 69.

ABS Control

Figure 7:
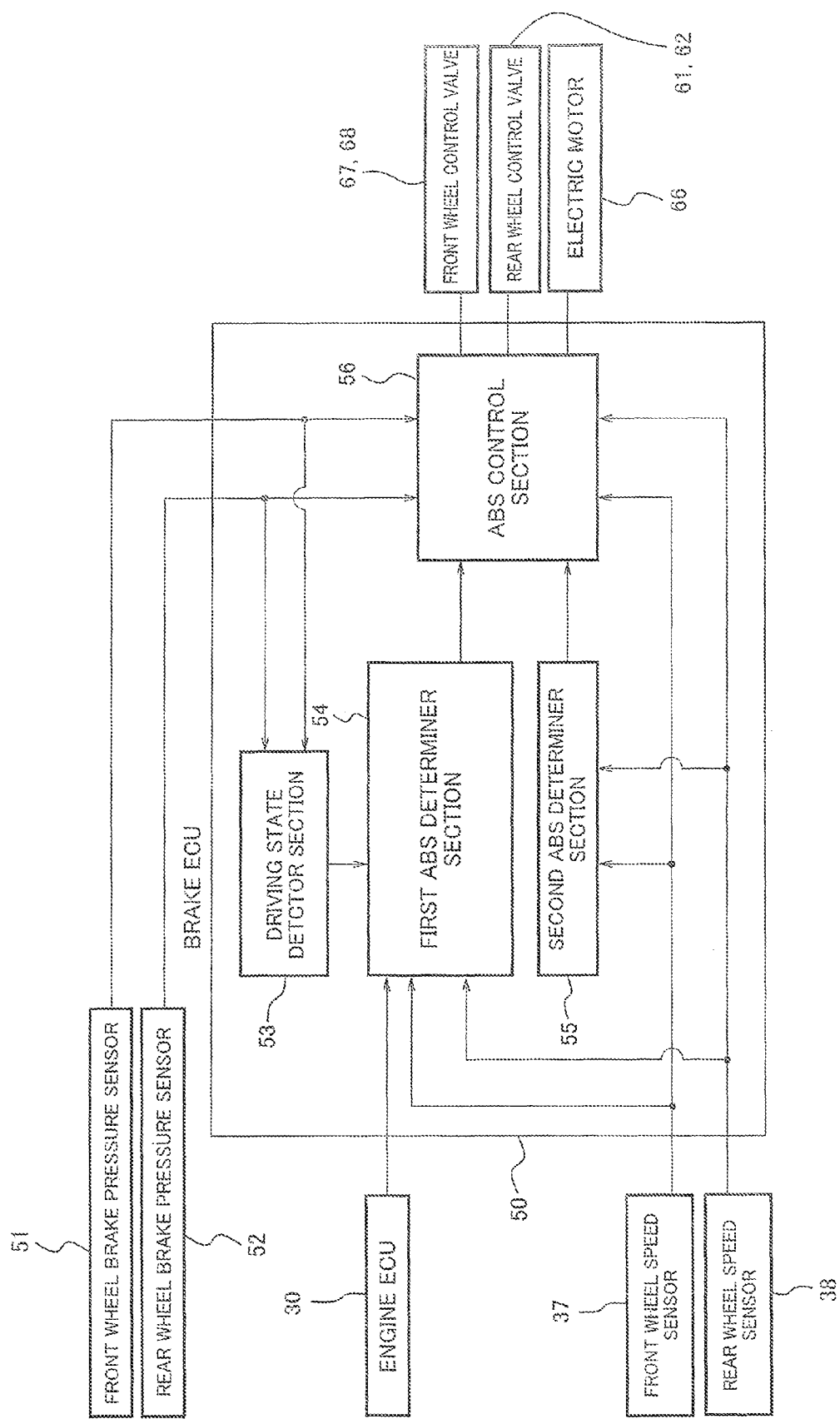
FIG. 7 is a block diagram showing major components in the brake control system.

FIG. 7 is a block diagram showing major components in the brake control system of Embodiment 1. For example, the brake ECU 50 includes a driving state detector section 53 which receives as inputs the signal from the brake pressure sensor 51 of the front wheel 2 and the signal from the brake pressure sensor 52 of the rear wheel 3 and detects brake pressures as state amounts indicating a driving state of the motorcycle 1 during braking, and a first ABS determiner section 54 which receives the signal from the front wheel speed sensor 37 and the signal from the rear wheel speed sensor 38 and determines that a first initiation condition used to initiate the ABS control is met if a decrease rate of the wheel speed of each of the front wheel 2 and the rear wheel 3 increases to a value which is equal to or greater than a predetermined threshold.

As used herein, the decrease rate of the wheel speed refers to a decrease amount (absolute value) of the wheel speed within a predetermined time in barking of the motorcycle 1. Like the increase rate $\Delta\omega$ of the crank angular velocity $\omega$, as the decrease rate of the wheel speed, a difference in the wheel speed, to be precise, a difference $\Delta Vf$ in the front wheel speed Vf and a difference $\Delta Vr$ in the rear wheel speed Vr may be used. Regarding the threshold used to initiate the ABS control, a braking characteristic of the motorcycle 1 is researched in an experiment or the like, and a threshold line (e.g., correlation curve in which the decrease rate $\Delta V$ of the wheel speed V increases according to an increase in the brake pressure applied to the wheel) set based on the braking characteristic of the motorcycle 1, may be electronically stored in the form of a table in a portion of a memory area of the brake ECU 50 as a table.

The brake ECU 50 further includes a second ABS determiner section 55 which determines that a second initiation condition used to initiate the ABS control for the wheel which is lower in vehicle speed is met, if the difference (absolute value) |Vf−Vr| between the front wheel speed Vf and the rear wheel speed Vr increases to a value which is equal to or greater than a predetermined threshold in braking, and an ABS control section 56 which reduces the braking force applied to the wheel in such a manner that the control valves 61, 62, 67 and 68 and the hydraulic pumps 63 and 69 in the hydraulic brake pressure system 60 are actuated as described above, if the second ABS determiner section 55 or the first ABS determiner section 54 determines that the initiation condition of the ABS control is met.

Assuming that one of the front wheel 2 and the rear wheel 3 is not slipping at all (its slip ratio is zero), the difference between the front wheel speed Vf and the rear wheel speed Vr is a value corresponding to a slip ratio of the other. For example, in a case where the rear wheel speed Vr is lower than the front wheel speed Vf during braking, a value (|Vf−Vr|/Vr) which is derived by dividing by the rear wheel speed Vr, an absolute value of a deviation |Vf−Vr| of the rear wheel speed Vr from the front wheel speed Vf may be assumed as the slip ratio of the rear wheel 3. That is, the first and second ABS determiner sections 54 and 55 determine the timing when the ABS control is initiated, based on the slip ratio of the front wheel 2 or the rear wheel 3.

The first and second ABS determiner sections 54 and 55, and the ABS control section 56 are implemented by executing software programs by CPU. The first and second ABS determiner sections 54 and 55, and the ABS control section 56 correspond to a slip control section which adjusts a braking force (force in the rotational direction) applied to the front wheel 2 or the rear wheel 3 during braking of the motorcycle 1 to suppress a wheel slip.

Estimation of Road Surface Condition

In the present embodiment, the engine ECU 30 is configured to estimate the road surface condition on which the motorcycle 1 is driving, based on the values relating to the slip ratio of the wheel 2, 3 used in calculation of the TRC control and the ABS control, for example, the increase rate $\Delta\omega$ of the crank angular velocity $\omega$, the difference $|Vf-Vr|$ between the front wheel speed Vf and the rear wheel speed Vr, a value derived by dividing the difference $|Vf-Vr|$ by the front wheel speed Vf or the rear wheel speed Vr, the difference $\Delta Vf$ in the front wheel speed Vf, the difference $\Delta Vr$ in the rear wheel speed Vr, etc. Hereinafter, the values relating to the slip ratio will be referred to as slip values S. A method of estimating the road surface condition on which the motorcycle 1 is driving, from the slip values S, will be described in brief.

Figures 8, 9:
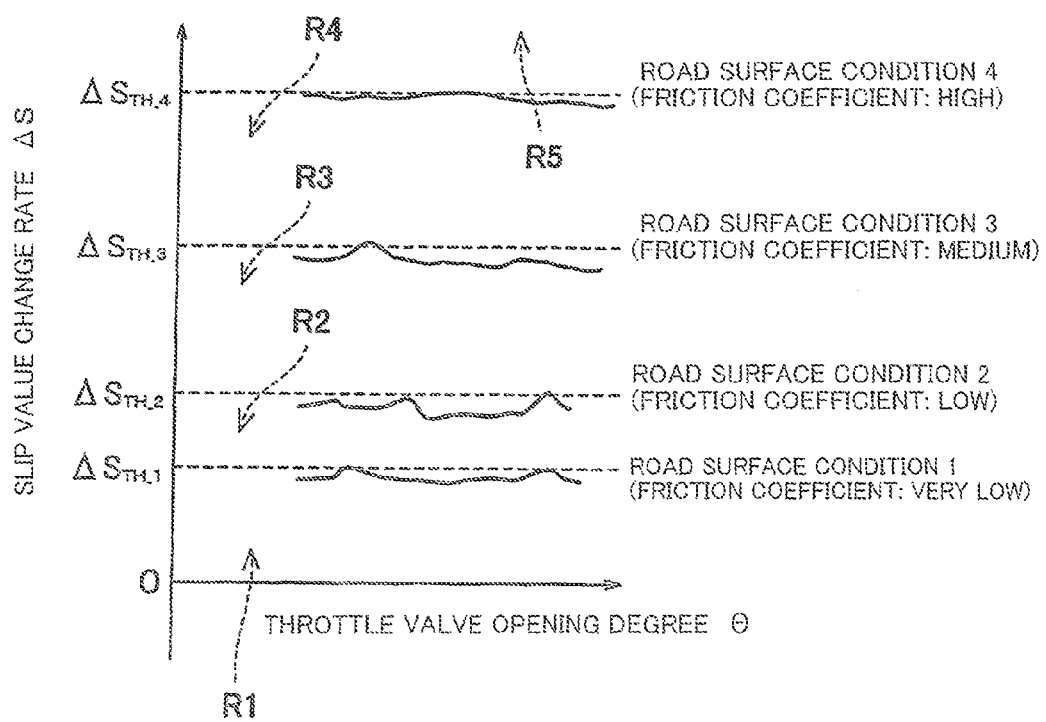
FIG. 8 is a chart showing the relationship among a road surface condition, a slip value and a slip value change rate which are derived by a driving test of the motorcycle.
FIG. 9 is a graph showing the relationship between a throttle valve opening degree and the slip value change rate.

As shown in FIG. 8, the relationship between the road surface condition, an average value of the slip values S and a change rate $\Delta S$ (change amount of the slip values per unit time and hereinafter referred to as slip value change rate) of the slip values S is derived by conducting a driving test of the motorcycle 1. "Road surface condition 1 to road surface condition 4" are ranked such that the road surface assigned with a smaller number has a higher friction coefficient with the wheel (tire). The slip value S and the slip value change rate $\Delta S$ are represented by ratios with respect to those of "road surface condition 1" when it is assumed that the slip value S and the slip value change rate $\Delta S$ of "road surface condition 1" are 1.

Although it cannot be decided that there is a correlation between a change in the friction coefficient and a change in the slip value S from the results of the driving test shown in FIG. 8, it can be understood that the slip value change rate $\Delta S$ is greater as the friction coefficient is smaller. Therefore, there is a strong correlation between the friction coefficient and the slip value change rate $\Delta S$. In addition, in the driving test, how the slip value change rate $\Delta S$ changed by changing a throttle valve opening degree $\theta$ was researched. As can be seen from FIG. 9, a maximum value of the slip value change rate $\Delta S$ did not change significantly irrespective of a magnitude of the throttle valve opening degree $\theta$, in the road surface condition 1 to road surface condition 4, which are different in friction coefficient.

From the above, the slip value change rate $\Delta S$ is calculated once every predetermined periods during driving of the motorcycle 1, and the road surface condition can be estimated based on an average value of the slip value change rates $\Delta S$. Specifically, the average value of the calculated slip value change rates $\Delta S$ is compared to, for example, four preset thresholds of $\Delta S_{TH\#1}$ to $\Delta S_{TH\#4}$ shown in FIG. 9, and the current road surface condition is determined as one of the road surface condition 1 to 4, depending on which ranges R1 to R5 defined by the four thresholds of $\Delta S_{TH\#1}$ to $\Delta S_{TH\#4}$ the slip value change rate $\Delta S$ falls in.

Although the four road surface conditions are defined as described above, the road surface conditions are not limited to these, but may be conditions corresponding to two or more ranges. Since the slip value change rates $\Delta S$ correspond to the road surface conditions, the slip value change rates $\Delta S$ may be output or utilized as a control parameter to control a vehicle body of the motorcycle 1.

Suspension Control

As described above with reference to FIG. 5, in the motorcycle 1 of the present embodiment, the engine ECU 30 and the brake ECU 50 are coupled together to enable signal transmission and reception via the CAN, and the suspension ECU 90 for controlling the damping force of the front fork 4 and the damping force of the cushion unit 18 is also coupled to the engine ECU 30 and to the brake ECU 50 to enable signal transmission and reception between them. As described below, the damping force is controlled in such a manner that the attitude of the motorcycle 1 is changed dynamically during driving, in association with the initiation of the TRC control or the ABS control. This control is referred to as ADC (active damping control).

Figure 10:
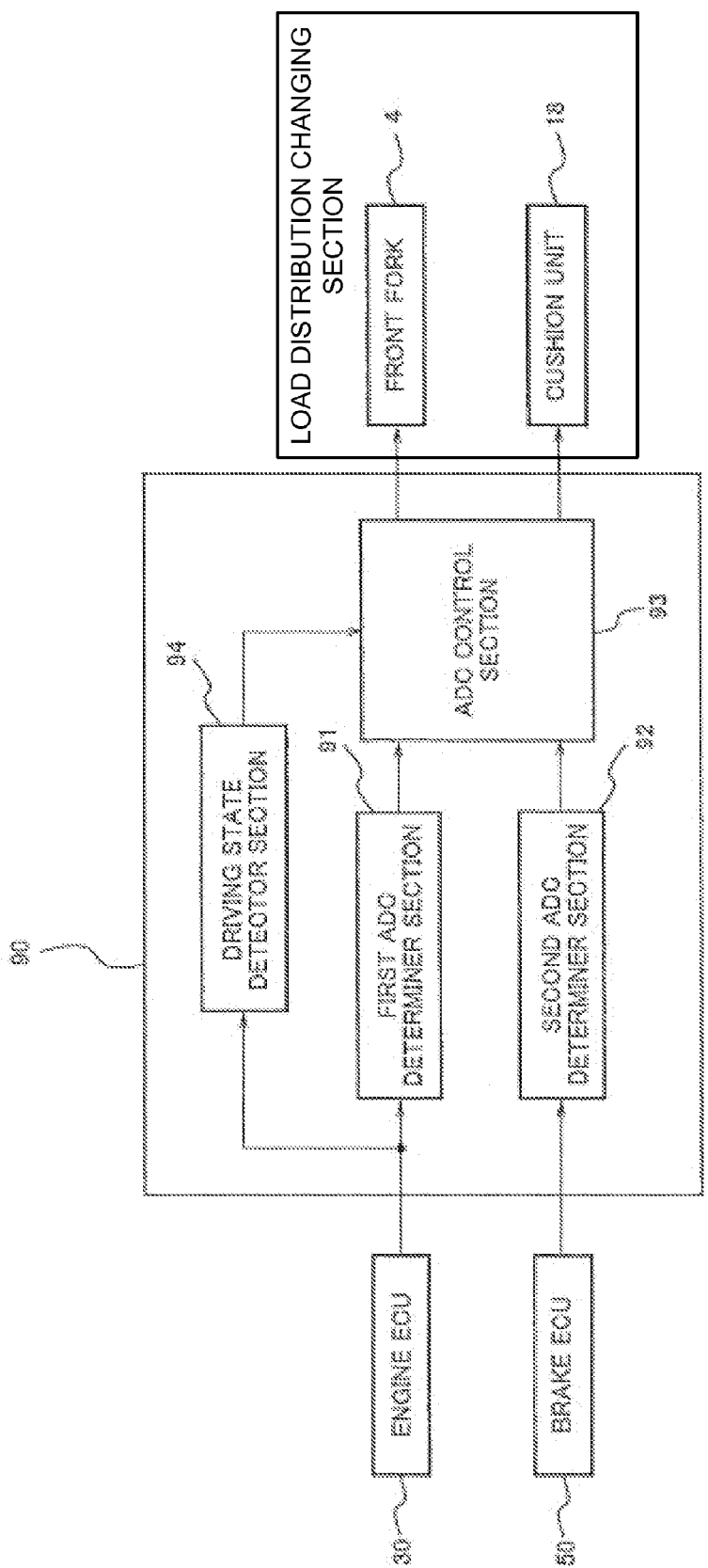
FIG. 10 is a block diagram showing major components in a suspension control system.

FIG. 10 is a block diagram showing major components in a suspension control system. In the suspension control system, the suspension ECU 90 receives as inputs, signals indicating specified information, such as the front wheel speed Vf, the rear wheel speed Vr, the bank angle $\beta$ detected by the bank angle sensor 39, etc. The suspension ECU 90 outputs control commands to the front fork 4 and to the cushion unit 18, to be precise, the electromagnetic actuator 47 of the valve unit 46 and to the electromagnetic actuator 187 of the valve unit 186.

Referring to FIG. 10, the suspension ECU 90 includes first and second ADC determiner sections 91, and 92, each of which determines, prior to the initiation of the ABS control, whether or not a predetermined condition (hereinafter referred to as a slip suppressing condition) used to suppress a slip of the front wheel 2 or the rear wheel 3 is met, and an ADC control section 93 for adjusting the damping force of at least one of the front fork 4 and the cushion unit 18 to increase a ground load of the front wheel 2 or the rear wheel 3 according to a result of the determination. The ground load of the front wheel 2 or the rear wheel 3 is defined by a vertical load applied by the front wheel 2 or the rear wheel 3, i.e., a pressing force applied by the front wheel 2 or the rear wheel 3 on the ground surface.

In the present embodiment, the suspension ECU 90 includes a driving state detector section 94 for detecting a driving state of the motorcycle 1 during acceleration or braking, based on, for example, the front wheel speed Vf, the rear wheel speed Vr, the bank angle $\beta$, or the like. The ADC control section 93 performs control based on the driving state of the motorcycle 1 in such a manner that when the bank angle $\beta$ is smaller, the amount of adjustment of the damping force is increased, for example. Also, the ADC control section 93 performs control based on the estimated road surface condition in such a manner that when the road surface condition is a slippery road surface condition, the amount of adjustment of the damping force is increased, for example.

The first ADC determiner section 91 determines that the slip suppressing condition of the rear wheel 3 is met, prior to the initiation of the TRC control during acceleration of the motorcycle 1, for example, in a state in which the rear wheel 3 is slipping and it is predicted that the TRC control is going to be initiated. The second ADC determiner section 92 determines that the slip suppressing condition of the front wheel 2 is met, prior to initiation of the ABS control during braking of the motorcycle 1, for example, when the front wheel 2 is more likely to be locked, and it is predicted that the ABS control is going to be initiated.

According to the determination, the following occurs. If the motorcycle 1 is accelerated, the ADC control section 93 causes the cushion unit 18 to reduce the damping force to more easily change (facilitate changing of) the attitude of the vehicle body such that the vehicle body is inclined in a rearward direction, to be precise, shift a load in the rearward direction, to increase the ground load of the rear wheel 3, thereby suppressing a spin of the rear wheel 3 (wheel spin), before the TRC control is initiated (hereinafter this control is referred to as first ADC control). On the other hand, if it is predicted that the front wheel 2 is more likely to be locked, the ADC control section 93 causes the front fork 4 to reduce the damping force to more easily change the attitude of the vehicle body such that the vehicle body is inclined in a forward direction, to be precise, shift a load in the forward direction, to increase the ground load of the front wheel 2, thereby suppressing a lock of the front wheel 2 (hereinafter this control is referred to as second ADC control).

In brief, if the first ADC determiner section 91 determines that the slip suppressing condition of the rear wheel 3 is met, or the second ADC determiner section 92 determines that the slipping condition of the front wheel 2 is met, the ADC control section 93 changes a buffering characteristic of the front fork 4 or the cushion unit 18 such that the front fork 4 or the cushion unit 18 is contracted (retracted) more easily, thereby changing the attitude of the vehicle body of the motorcycle 1 around a pitching axis. In other words, in the present embodiment, the configuration for adjusting the damping force of the front fork 4 which is the buffer device of the front wheel 2 or the damping force of the cushion unit 18 which is the buffer device of the rear wheel 3, corresponds to an attitude changing section for changing the attitude of the vehicle body of the motorcycle 1 around the pitching axis.

The first ADC determiner section 91, the second ADC determiner section 92, the ADC control section 93, and the driving state detector section 94, are implemented by software programs executed by the CPU in the suspension ECU 90, as shown in the flow (see FIG. 11) as described below. The first and second ADC determiner sections 91, 92 correspond to a slip suppressing condition determiner section. The ADC control section 93 corresponds to a load distribution control section for changing a load distribution between the front and rear wheels 2 and 3, such that the load shifts to the front wheel 2 or to the rear wheel 3 by changing the attitude of the motorcycle 1 around the pitching axis during driving. For example, the ADC control section 93 changes the damping force of the front fork 4 or the cushion unit 18 such that its timing or how to change the damping force is changed depending on the driving state, such as a vehicle speed of the motorcycle 1.

Procedure of ADC Control

Hereinafter, the procedure for the ADC control will be specifically described with reference to the flowchart of FIG. 11. Initially, after start, in step SA1, a value of an ADC flag F1 indicating whether or not the first ADC control is active is read, and if F1=1, i.e., the first ADC control is being executed (NO in step SA1), the process goes to step SA6. On the other hand, if F1=0, i.e., the first ADC control is not active (YES in step SA1), the process goes to step SA2. In step SA2, a value of an ADC flag F2 indicating whether or not the second ADC control is active is read, and if F2=1, i.e., the second ADC control is active (NO in step SA2), the process goes to step SA11. On the other hand, if F2=0, i.e., the second ADC control is not active (YES in step SA2), the process goes to step SA3.

In step SA3, it is determined whether or not the motorcycle 1 is accelerated based on a change in the displacement amount of the throttle grip 7, the increase rate Δω of the crank angular velocity ω of the engine E, the increase rate of the rear wheel speed Vr, etc. If YES in step SA3, the process goes to step SA4. In step SA4, it is determined whether or not the condition used to initiate the first ADC control for increasing the ground load of the rear wheel 3 to suppress a slip of the rear wheel 3, i.e., the slip suppressing condition of the rear wheel 3 is met.

For this determination, the increase rate Δω of the crank angular velocity ω per unit time is obtained from the first TRC determiner section 31a in the engine control calculating section 31 of the engine ECU 30. And, it may be predicted that the TRC control is going to be initiated and it may be determined that the slip suppressing condition is met, if the value of the increase rate Δω is equal to or greater than a predetermined threshold less than a threshold of the first initiation condition of the TRC control. In the same manner, the slip ratio of the rear wheel 3 is obtained from the second TRC determiner section 31b in the engine control calculating section 31 of the engine ECU 30. And, it may be determined that the slip suppressing condition is met, if the value of the slip ratio is equal to or greater than a predetermined threshold less than a threshold of the second initiation condition of the TRC control.

If it is determined that the slip suppressing condition of the rear wheel 3 is met in step SA4, the value of the ADC flag F1 is set to 1 (F1←1) in step SA5, and the process goes to step SA6. In step SA6, the first ADC control is executed to increase the ground load of the rear wheel 3. Specifically, the cushion unit 18 is caused to reduce the damping force to more easily change the attitude of the motorcycle 1 according to the acceleration such that the vehicle body is inclined in a rearward direction, to be precise, shift a load in the rearward direction to the rear wheel 3, thereby increasing a gripping force of the rear wheel 3. In addition, the damping force of the front fork 4 is increased.

The reduction amount of the damping force of the cushion unit 18 under control of the first ADC control may be set such that the reduction amount of the damping force is smaller when the front wheel speed Vf is higher, and therefore the rear wheel 3 is less likely to spin. Also, the reduction amount of the damping force of the cushion unit 18 may be set such that the reduction amount of the damping force is greater when the bank angle β is greater and therefore the rear wheel 3 is more likely to spin. Also, the reduction amount of the damping force of the cushion unit 18 may be set such that the reduction amount of the damping force is greater when the estimated road surface condition has a lower friction coefficient.

On the other hand, if NO in step SA3, and the motorcycle 1 is not accelerated, the process goes to step SA7. In step SA7, information relating to the brake pressure of the front wheel 2 and the brake pressure of the rear wheel 3 are obtained via the brake ECU 50, and it is determined whether or not the motorcycle 1 is being braked based on the information relating to the brake pressure. If NO in step SA7, and the motorcycle 1 is neither accelerated nor braked, in step SA8, the first ADC flag F1 and the second ADC flag F2 are reset (F1←0, F2←0), and the process returns to step SA1.

On the other hand, if it is determined that the motorcycle 1 is braked (YES in step SA7), the process goes to step SA9. In step SA9, it is determined whether or not the initiation condition of the second ADC control for increasing the ground load of the front wheel 2 to suppress a slip of the front wheel 2, i.e., the slip suppressing condition of the front wheel 2 is met. For this determination, information indicative of the decrease rate of the front wheel speed Vf during braking is obtained from the first ABS determiner section 54 in the brake ECU 50. It may be predicted that the ABS control of the front wheel 2 is going to be initiated and it may be determined that the slip suppressing condition is met, if the decrease rate of the front wheel speed Vf is equal to or greater than a predetermined threshold less than the threshold of the first initiation condition of the ABS control.

Or, the difference (absolute value) |Vf−Vr| between the front wheel speed Vf and the rear wheel speed Vr is obtained from the second ABS determiner section 55 in the brake ECU 50. It may be predicted that the ABS control of the front wheel 2 is going to be initiated and it may be determined that the slip suppressing condition is met, if the difference |Vf−Vr| is equal to or greater than a predetermined threshold less than a threshold of the second initiation condition of the ABS control. Then, in step SA10, the value of the ADC flag F2 is set to 1, and the process goes to step SA11. In step SA11, the second ADC control is executed to increase the ground load of the front wheel 2.

In step SA11, before the ABS control is initiated during braking, the front fork 4 is caused to reduce the damping force, to more easily change the attitude of the motorcycle 1 such that the vehicle body is inclined in a forward direction according to the braking, to be precise, shift a load in the forward direction to the front wheel 2, thereby increasing a gripping force of the front wheel 2. During braking, the rear wheel 3 tends to become away from the road surface. Therefore, the damping force of the cushion unit 18 may be reduced to easily maintain a grounded state of the rear wheel 3 on the road surface. During braking, a moment for suppressing the rear wheel 3 from becoming away from the road surface acts on the swing arm 12 around a pivot at a front end thereof. Therefore, the damping force of the cushion unit 18 may be increased to increase the ground load of the rear wheel 3.

The reduction amount of the damping force of the front fork 4 under control of the second ADC control during braking may be set such that the reduction amount of the damping force is smaller as the rear wheel speed Vr is higher and the bank angle β is greater. This is because the load tends to shift to a greater degree by braking when the wheel speed is higher and the attitude of the motorcycle 1 tends to become unstable by rapid braking when the bank angle β is greater. In addition, the reduction amount of the damping force may be set greater for the road surface condition with a lower friction coefficient, according to the estimated road surface condition.

Although in the above flow, the ADC control is initiated at a timing immediately before the TRC control or the ABS control is initiated, it may be initiated at the same time (concurrently with) or at a timing retarded with respect to the initiation of the TRC control or the ABS control. Or, the timing when the ADC control is initiated may be changed based on the driving state of the motorcycle 1. For example, in the first ADC control during acceleration, if the bank angle β is greater and a spin of the rear wheel 3 will probably cause the motorcycle 1 to fall, a priority is given to the initiation of the TRC control rather than the ADC control, while if the bank angle β is smaller, the ADC control is initiated before the TRC control is initiated, to increase the ground load of the rear wheel 3.

In the second ADC control during braking, if the vehicle speed of the motorcycle 1 is in a lower range during braking, the ADC control is initiated before the ABS control is initiated, as described above, while if the vehicle speed of the motorcycle 1 is in a higher range, the ABS control is initiated before the ADC control is initiated, because the load tends to shift to a greater degree by braking or a great change in the attitude of the motorcycle 1 is unfavorable. This allows the ADC control to be initiated after the vehicle speed has been decreased to some degree. As a result, it is possible to prevent the change in the attitude of the motorcycle 1 from increasing.

Moreover, the order of the timing when the TRC control is initiated, the timing when the ABS control is initiated, and the timing when the ADC control is initiated may be changed, depending on a mode (town mode or a sport driving mode) selected by the driver of the motorcycle 1. Consideration should be given to the fact that, if the ADC control is initiated at the same time that the TRC control or the ABS control is initiated, control with higher responsiveness works more effectively at an earlier time, in actual cases.

Figure 12A:
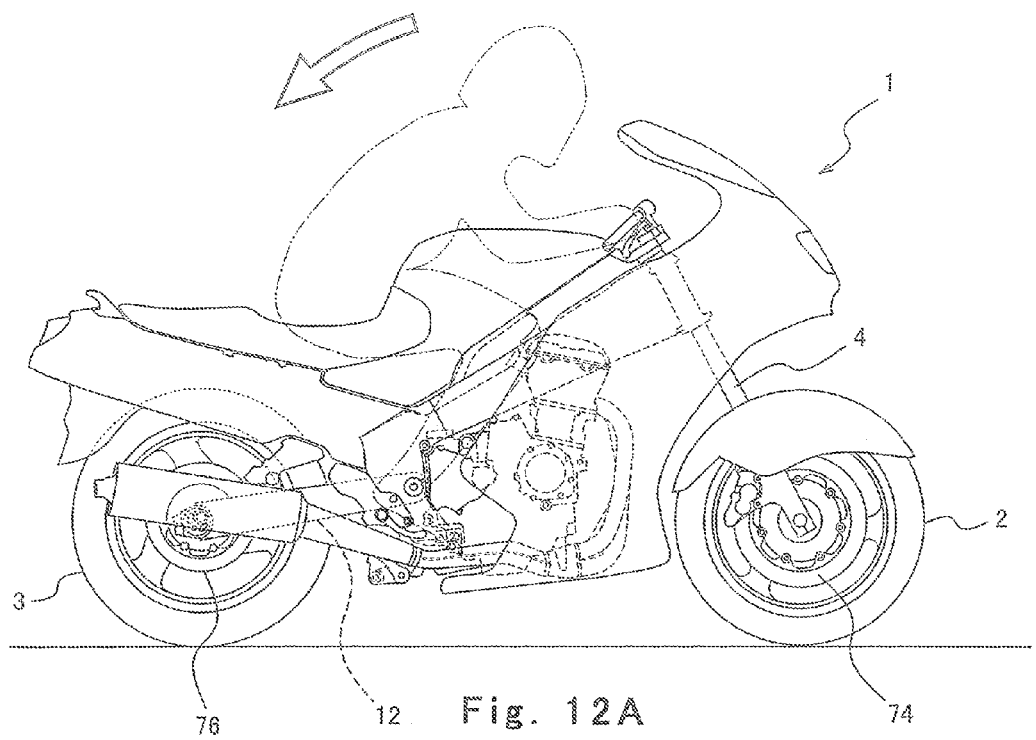
FIG. 12A is a view showing an attitude change and load shifting in the motorcycle during acceleration.

A description will be given of the change in the attitude of the motorcycle 1 and the load shifting by the ADC control of Embodiment 1, during acceleration and braking, with reference to FIG. 12. During acceleration, the damping force of the cushion unit 18 is reduced immediately before the TRC control is initiated. As shown in FIG. 12A, the rear portion of the motorcycle 1 is diving, the load shifts to a greater degree to the rear wheel 3, and the ground load of the rear wheel 3 increases. Thus, a maximum gripping force generated in the rear wheel 3 increases, which allows the driving power to be transmitted to the road surface effectively.

Since a slip of the rear wheel 3 is suppressed by increasing the ground load of the rear wheel 3 before the TRC control is initiated, the frequency with which the TRC control takes place can be reduced. As a result, drive feel can be improved. In addition, an extent to which the engine driving power is reduced can be lessened even when the TRC control takes place, which can improve a driving power performance of the motorcycle 1.

Figure 12B:
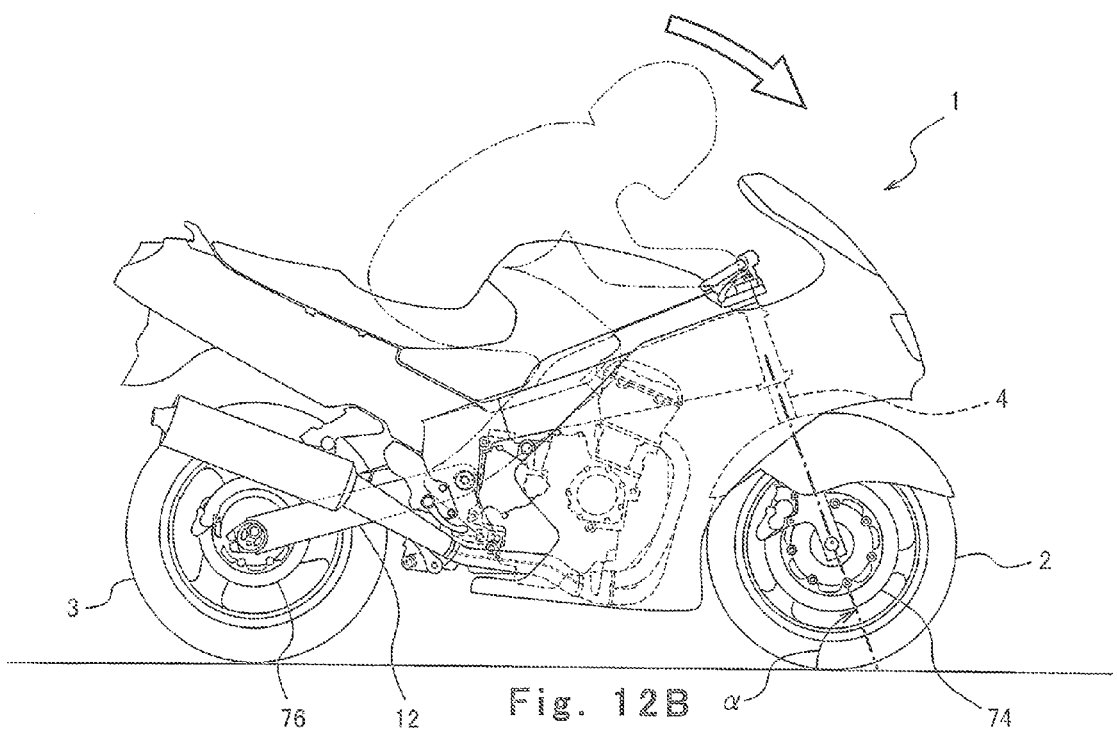
FIG. 12B is a view showing an attitude change and load shifting in the motorcycle during braking.

During braking, the damping force of the front fork 4 is reduced immediately before the ABS control is initiated. As shown in FIG. 12B, the front portion of the motorcycle 1 is diving, the load shifts to a greater degree to the front wheel 2, and the ground load of the front wheel 2 increases. In this case, as shown in FIG. 12B, the front fork 4 is contracted (retracted) and extends substantially vertically, and an inclination angle α of the front fork 4 with respect to the road surface increases. Therefore, a component of the load applied from the front fork 4 to the front wheel 2, which component is perpendicular to the road surface, increases. Because of this, and the load shifting to the front wheel 2, the ground load of the front wheel 2 increases.

Therefore, a gripping force generated in the front wheel 2 increases sufficiently, which allows the braking force to be transmitted to the road surface effectively. The frequency with which the ABS control takes place can be reduced. As a result, drive feel can be improved. In addition, an extent to which the braking force is reduced is lessened even when the ABS control is initiated, which reduces a braking distance. Although a great braking force cannot be expected from the rear wheel 3 which tends to become away from the road surface during braking, the ABS control makes it possible to prevent a lock of the rear wheel 3 and maintain the state of the rear wheel 3 with respect to the road surface.

On the basis of the characteristic of the motorcycle 1 in which the load shifting occurs to a greater degree and quickly during acceleration or braking and by utilizing the load shifting, the ADC control is performed to actively increase the ground load of the front wheel 2 or the rear wheel 3, thereby suppressing a slip of the front wheel 2 or the rear wheel 3. In this way, driving power performance, and braking performance of the motorcycle 1 can be improved by lessening the problems associated with the TRC control and the ABS control.

Since determination as to the initiation of the ADC control is performed by using a parameter used to determine whether or not to initiate the TRC control or the ABS control, and ADC control is initiated immediately before the TRC control or the ABS control is initiated, the control system is implemented in a simplified manner. In addition, since the brake ECU 50 for performing the ABS control and the suspension ECU 90 for performing the ADC control are configured by control units separate from the engine ECU 30 for performing the TRC control, processing burden can be distributed and responsiveness of control can be ensured.

Moreover, in accordance with the present embodiment, the damping force of the front fork 4 or the cushion unit 18 can be reduced properly, during acceleration or braking, based on the driving state of the motorcycle 1, such as the vehicle speed (front wheel speed Vf or rear wheel speed Vr) of the motorcycle 1, or the bank angle β, or the road surface condition. Therefore, the ADC control can be carried out optimally in cooperation with the TRC control and the ABS control, while avoiding a situation in which the attitude of the motorcycle 1 becomes unstable and makes the driver feel discomfort during driving.

Embodiment 2

Next, Embodiment 2 will be described. In Embodiment 2, during braking of the motorcycle 1, the damping force of the front fork 4 is reduced as in the case of Embodiment 1, and then is increased at a time point when the front fork 4 has been contracted to a substantially shortest length, thereby maintaining a state in which the ground load of the front wheel 2 is increased. In other respects, Embodiment 2 is identical to Embodiment 1, and the same components as those in Embodiment 1 are identified by the same reference symbols and will not be described in repetition.

Figure 11:
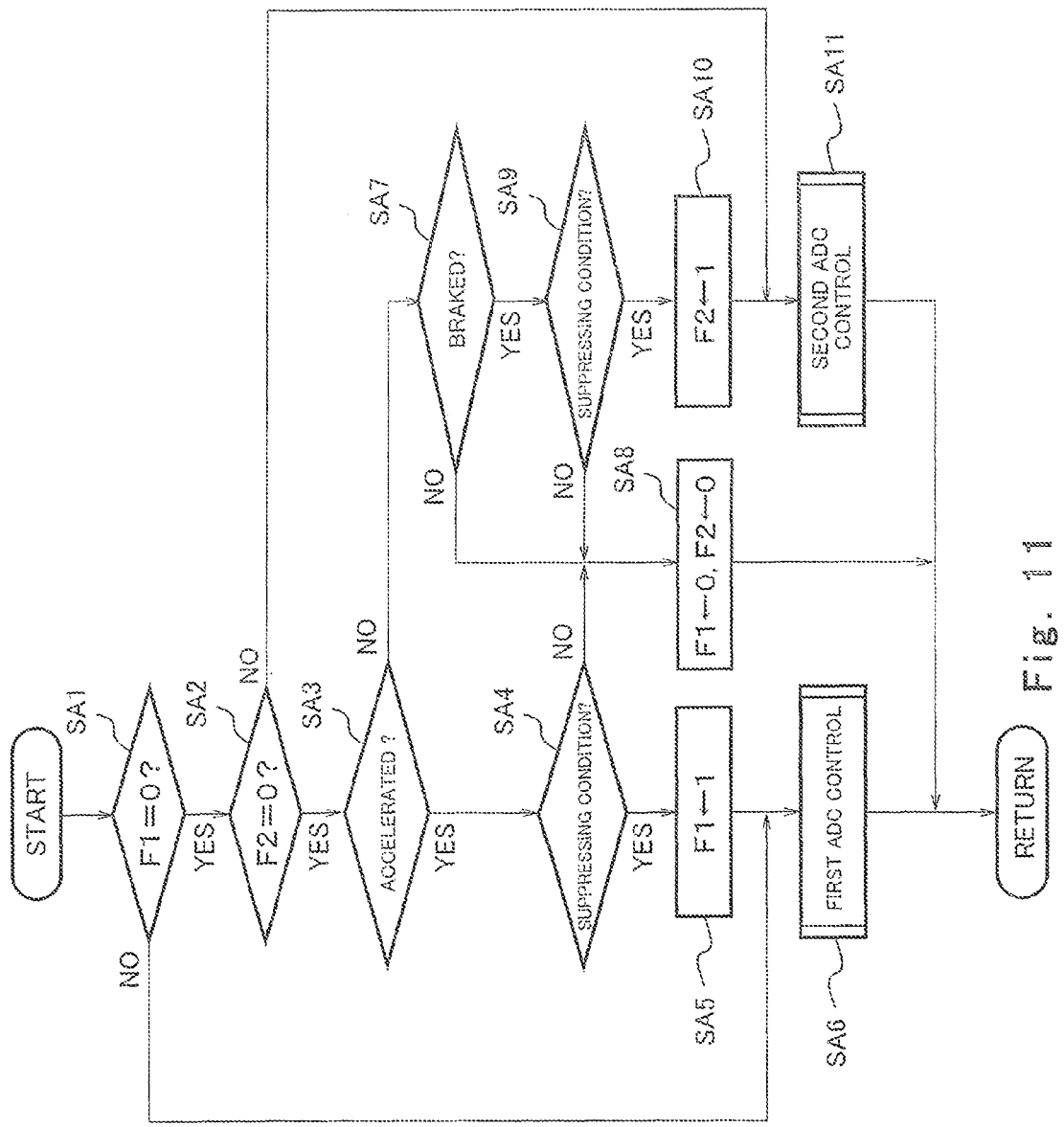
FIG. 11 is a flowchart showing an exemplary procedure of a suspension control.
Figure 13:
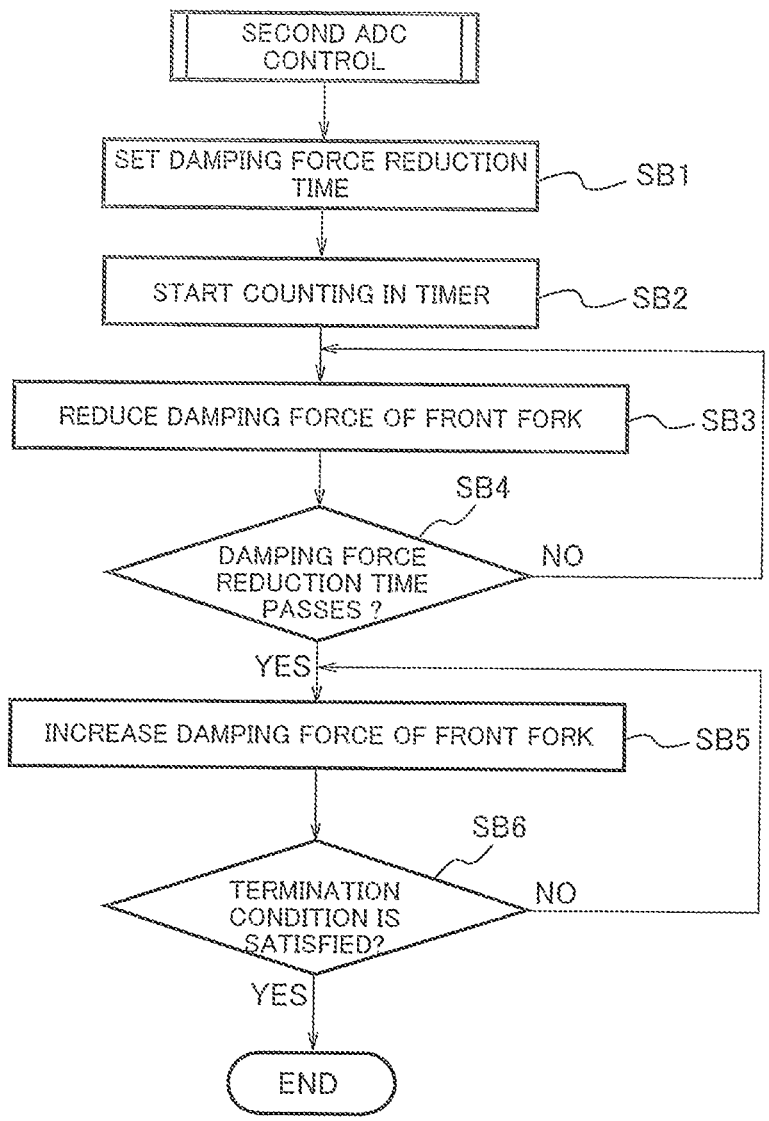
FIG. 13 is a flowchart showing an exemplary procedure of a second ADC control according to Embodiment 2.

Referring to FIG. 13 showing the second ADC control in step SA11 in the flow of FIG. 11, initially, in step SB1, a damping force reduction time (period) during which the damping force of the front fork 4 is reduced is set based on the driving state of the motorcycle 1. Then, in step SB2, a timer built into the suspension ECU 90 starts counting. In step SB3, the opening degree of the control valve of the valve unit 46 is increased to reduce the damping force of the front fork 4. The damping force reduction time may be defined as a time period during which the front fork 4 is in a contracted state. After the passage of the damping force reduction time, the contracted front fork 4 starts to be extended as the resulting reaction. The damping force reduction time may correspond to at least the vehicle speed and the braking force in the form of a table, and the table may be electronically stored in the memory of the suspension ECU 90.

Then, in step SB4, it is determined whether or not a counted value of the timer has reached a value corresponding to the damping force reduction time. If NO in step SB4, the process returns to step SB3, and a state in which the damping force of the front fork 4 is smaller is maintained. That is, during a time period from when the second ADC control is initiated until the predetermined damping force reduction time passes, the damping force of the front fork 4 is smaller and the front fork 4 is more easily contracted, thereby allowing the load to more easily shift to the front wheel 2 by braking. When the front fork 4 is contracted and extends substantially vertically, the coil spring 43 mounted therein is compressed and the ground load of the front wheel 2 increases (see FIG. 12B).

After the predetermined damping force reduction time passes, and the front fork 4 has been contracted sufficiently, it is determined as YES in step SB4. Then, the damping force of the front fork 4 is increased to suppress the front fork 4 from being extended (step SB5). Thereby, the motorcycle 1 maintains a state in which the front fork 4 is contracted, the front portion of the motorcycle 1 is diving, and the ground load of the front wheel 2 is greater. In other words, the motorcycle 1 can maintain a state in which the front wheel 2 has a sufficient gripping force on the road surface because of the greater ground load and thereby a slip of the front wheel 2 is suppressed.

Then, in step SB6, it is determined whether or not a termination condition of the second ADC control is met. The termination condition of the second ADC control may include, for example, a condition in which the counted value of the timer has reached a value corresponding to a preset damping force increase time, a brake pressure is diminished after the driver's brake operation has ended, or the vehicle speed (front wheel speed Vf or rear wheel speed Vr) has decreased to a value equal to or less than a predetermined value. If NO in step SB6, the process returns to step SB5, and the state in which the damping force of the front fork 4 is greater is maintained. If YES in step SB6, the second ADC control terminates (ends).

The first ADC control is initiated so as to correspond to the TRC control during acceleration of the motorcycle 1. In this case, the damping force of the cushion unit 18 may continue to be reduced in view of the fact that the load continues to shift in a rearward direction by acceleration more gently for a longer period of time than during braking, a ground property of the rear wheel 3 on a bumpy (uneven) road surface condition, etc. Or, the damping force may be increased after a passage of a predetermined time like the second ADC control.

Embodiment 3

Next, Embodiment 3 will be described. In Embodiment 3, during acceleration or braking of the motorcycle 1, the ADC control is performed in such a manner that the damping force corresponding to an extension of the cushion unit 18 or the front fork 4, and the damping force corresponding to a contraction of the cushion unit 18 or the front fork 4, are changed individually. In other respects, Embodiment 3 is identical to Embodiment 1, and the same components as those in Embodiment 1 are identified by the same reference symbols and will not be described.

In Embodiment 3, the damping force corresponding to an extension and the damping force corresponding to a contraction of at least either the cushion unit 18 or the front fork 4 are changed individually. The configuration of such a buffer device is known and will not be shown. For example, the valve unit 46 of the front fork 4 of FIG. 2A is provided with a control valve capable of adjusting its opening degree to restrict only the flow of the oil from the contraction operating chamber 41*b* to the reservoir 45. The piston 42 is provided with a control valve capable of adjusting its opening degree to restrict only the flow of the oil from the extension operating chamber 41*a* to the contraction operating chamber 41*b*. For example, the control valve may be a rotary valve, the rod 43 may have a hollow structure, and a shaft inserted into the hollow rod 43 is coupled to the rotary valve such that the shaft is rotatable by an electric motor. Or, the piston 42 may be provided with a spool valve and an electromagnetic solenoid for actuating the spool valve.

To individually change the damping force corresponding to the extension of the front fork 4 and the damping force corresponding to the contraction of the front fork 4, in step SA11 in the flow of FIG. 11 in the second ADC control, the damping force corresponding to the contraction of the front fork 4 is reduced to allow the load to more easily shift to the front wheel 2 during braking, while the damping force corresponding to the extension of the front fork 4 is increased to suppress the contracted front fork 4 from being extended as the resulting reaction. Thus, as described with reference to FIG. 12B, the attitude of the motorcycle 1 in which the front portion of the motorcycle 1 is diving is maintained, and the state in which the ground load of the front wheel 2 is greater is maintained.

To individually change the damping force corresponding to the extension of the cushion unit 18 and the damping force corresponding to the contraction of the cushion unit 18, in step SA6 in the flow of FIG. 11 in the first ADC control, the damping force corresponding to the contraction of the cushion unit 18 is reduced to allow the load to more easily shift to the rear wheel 3 during acceleration, while the damping force corresponding to the extension of the cushion unit 18 is increased to maintain a state in which the rear portion of the motorcycle 1 is diving, thereby allowing the driving power of the rear wheel 3 to be transmitted to the road surface sufficiently.

In a case where the damping force corresponding to the extension and the damping force corresponding to the contraction of each of the cushion unit 18 and the front fork 4 are changed individually, the ADC control may be implemented in various ways. For example, during braking, the damping force corresponding to the contraction of the front fork 4 may be reduced, the damping force corresponding to the extension of the cushion unit 18 may be reduced, and the damping force corresponding to the contraction of the cushion unit 18 may be increased. In that case, to stabilize the attitude of the motorcycle 1, the damping force corresponding to the contraction of the front fork 4 may be reduced to allow the front portion of the motorcycle 1 to dive, and then the damping force corresponding to the contraction of the cushion unit 18 may be increased a little time thereafter.

Conversely, during acceleration, the damping force corresponding to the contraction of the cushion unit 18 may be reduced, the damping force corresponding to the extension of the front fork 4 may be reduced, and the damping force corresponding to the contraction of the front fork 4 may be increased. Also, during acceleration, in view of a grounding property of the front wheel 2 on a bumpy (uneven) road surface, the damping force corresponding to the extension of the front fork 4 and the damping force corresponding to contraction of the front fork 4 may be both reduced.

Or, the characteristic of the buffer device of the wheel which is different from the wheel whose slip is to be suppressed may be changed in such a manner that the damping force corresponding to the extension of the front fork 4 is reduced and the damping force corresponding to the contraction of the front fork 4 is increased during acceleration, or the damping force corresponding to the extension of the cushion unit 18 is reduced and the damping force corresponding to contraction of the cushion unit 18 is increased during braking. Or, only the damping force of the cushion unit 18 may be changed irrespective of acceleration or braking. In this case, there is no need for a mechanism for adjusting the damping force in the front fork 4, which reduces cost.

Embodiment 4

Next, Embodiment 4 will be described. In Embodiment 4, instead of executing the ADC control in association with the TRC control and the ABS control, like Embodiment 1 to Embodiment 3, the ADC control is initiated if a predetermined slip suppressing condition irrelevant to the TRC control and the ABS control is met. In other respects, Embodiment 4 is identical to Embodiment 1, and the same components as those in Embodiment 1 are identified by the same reference symbols and will not be described.

The predetermined slip suppressing condition may be, for example, a condition in which the motorcycle 1 is in a preset driving state, or a road surface condition is a preset road surface condition. For example, during rapid braking when the brake pressure of the front wheel 2 or the rear wheel 3 increases to a value equal to or greater than a predetermined value, or during rapid acceleration when the throttle grip 7 is moved quickly to accelerate the motorcycle 1 (a displacement amount of the throttle grip 7 per unit time is equal to or greater than a preset value), it may be determined that the slip suppressing condition of the front wheel 2 or the rear wheel 3 is met. Or, when at least one of the brake lever 8 and the brake pedal 16 is operated, or when the throttle grip 7 is moved quickly to decelerate the motorcycle 1 (a displacement amount of the throttle grip 7 per unit time is equal to or greater than a preset value), it may be determined that the slip suppressing condition of the front wheel 2 is met.

Or, according to the selection of the mode select switch 59 operated by the driver, for example, in a mode to initiate the TRC control actively, it may be determined that the slip suppressing condition of the front wheel 2 or the rear wheel 3 is met. Or, when the estimated road surface condition is the road surface condition 1 which is slippery, it may be determined that the slip suppressing condition of the front wheel 2 and the slip suppressing condition of the rear wheel 3 are met. In accordance with Embodiment 4, even when the motorcycle 1 does not include the system for the TRC control or the ABS control, the slip of the front wheel 2 or the rear wheel 3 can be suppressed by the ADC control.

Other Embodiments

The above embodiments are merely exemplary, and are in no way intended to limit the present invention. The embodiments can be improved, changed or modified within the scope of the invention. Although in Embodiment 1 to Embodiment 3, the amount of adjustment of the damping force of the front fork 4 or the cushion unit 18 in the ADC control is changed based on the vehicle speed of the motorcycle 1, the bank angle β of the motorcycle 1, and the estimated road surface condition, it may be changed according to the selection of the mode select switch 59 operated by the driver. In a further alternative, the slip suppressing condition used to initiate the ADC control may be changed based on the driving state of the motorcycle 1, the road surface condition, or the selection of the mode select switch 59 operated by the driver.

Although in the above embodiments, the damping force of the front fork 4 and the damping force of the cushion unit 18 are changed, spring forces may be changed instead of or in addition to the damping forces, to allow the attitude of the motorcycle 1 to be changed more easily during acceleration or braking of the motorcycle 1. Or, the stroke length of the front fork 4 and the stroke length of the cushion unit 18 may be changed to change the attitude of the motorcycle 1. For example, the stroke length of the cushion unit 18 may be increased during braking to allow the load to more easily shift to the front wheel 2.

The buffer device is in no way limited to the telescopic front fork 4 or the cushion unit 18 of the swing arm 12. The suspension is not limited to the above described suspension. Or, the attitude of the vehicle body may be changed by a method different from the method of changing the characteristic of the buffer device. Or, the attitude of the vehicle body may not be changed and the load distribution between the front and rear wheels 2 and 3 may be changed by other methods. For example, a weight may be mounted to the motorcycle 1 such that the weight is displaceable in the forward and rearward direction. The weight may be displaced in the rearward direction during acceleration, and in the forward direction during braking, to change the load distribution between the front and rear wheels 2 and 3.

The configuration of the engine ECU 30, the configuration of the brake ECU 50, and the configuration of the suspension ECU 90 described in the above embodiments are merely exemplary. In the above embodiments, as shown in FIG. 5, the engine ECU 30 capable of the TRC control, the brake ECU 50 capable of the ABS control and the suspension ECU 90 capable of the ADC control are coupled to each other via the CAN, and the engine ECU 30 serves as the master controller and provides commands to the brake ECU 50 and to the suspension ECU 90.

Figure 14:
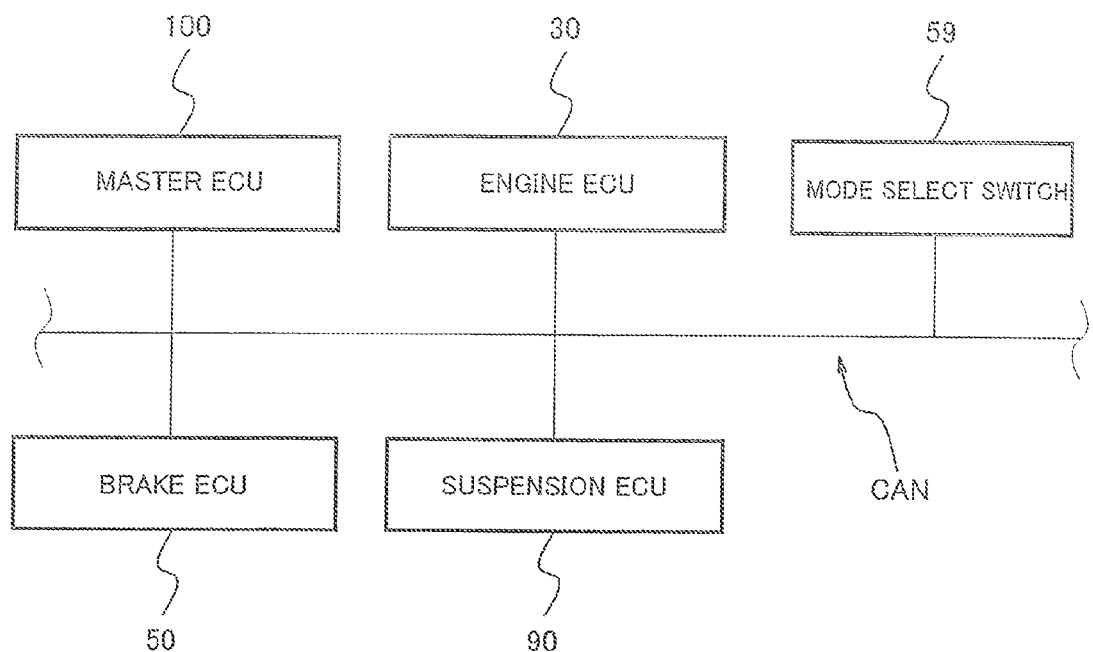
FIG. 14 is a block diagram corresponding to FIG. 5 according to another embodiment, showing the engine ECU, the brake ECU, the suspension ECU, and a main ECU for totally (collectively) controlling the engine ECU, the brake ECU, the suspension ECU.

Alternatively, as shown in FIG. 14, a main ECU 100 may be incorporated into the motorcycle 1 to collectively control the engine ECU 30, the brake ECU 50 and the suspension ECU 90. In this configuration, for example, the main ECU 100 provides commands to the engine ECU 30, the brake ECU 50 and the suspension ECU 90, to permit initiation or termination of the TRC control, the ABS control and the ADC control. In response to the commands, engine ECU 30, the brake ECU 50 and the suspension ECU 90 initiate or terminate the TRC control, the ABS control and the ADC control and send information indicative of active/inactive state of the control, to the main ECU 100.

The main ECU 100 may determine whether or not the initiation condition of the TRC control, the ABS control or the ADC control is met, and provides a command to each of the engine ECU 30, the brake ECU 50 and the suspension ECU 90. In this case, the main ECU 100 may receive information given by the driver, such as a traction control mode, passenger information, driving information, or the like, from an interface, via the CAN, and may change the initiation condition of the TRC control, the ABS control or the ADC control, based on the received information. The traction control mode is an execution mode of the TRC control. For example, in a case where the value of the traction control mode is greater, the ADC control may be initiated more easily. In a case where the value of the passenger information (weight) is smaller, the damping force of the front fork 4 or the cushion unit 18 may be increased. The damping force may also be changed depending on a town mode or a sport driving mode.

Although not shown, the main ECU 100 may be implemented by the brake ECU 50 or the suspension ECU 90, or the ECUs 50, 90, and 100 may be integrated together. In brief, some or all of the ECUs 30, 50, 90, and 100 may be integrated into a single ECU based on processor capabilities of the ECUs and cost.

The content of the TRC control and the content of the ABS control are not limited to those described in the above embodiments and may be different. In a case where the driving power source of the motorcycle 1 is an electric motor rather than the engine E, only torque of the electric motor may be adjusted in the TRC control, and a regenerative braking amount of the electric motor may be adjusted in the ABS control.

Although in the above embodiments, the present invention is applied to the motorcycle 1, it may be applied to, for example, straddle-type vehicles other than the motorcycle. In the straddle-type vehicle straddled by the driver, the pitching motion occurs easily because its center of gravity is high. In addition, in the straddle-type vehicle, a wheel spin tends to occur during acceleration and a lock tends to occur during braking, because its driving power is great even though its weight is small and its ground load is small. Therefore, the present invention which can suppress a wheel slip by utilizing the load shifting due to the pitching mode, is especially effectively applicable to the straddle-type vehicle. The straddle-type vehicle includes an ATV (all terrain vehicle) as well as the motorcycle.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A control system in a straddle-type vehicle including front and rear wheels, comprising:
    a load distribution changing section which changes a ground load distribution between the front and rear wheels during driving of the vehicle;
    a slip suppressing condition determiner section which determines whether or not a suppressing condition used to suppress a slip of one of the front and rear wheels is met, during driving of the vehicle;
    a load distribution control section which controls the load distribution changing section to make the ground load of the one of the front and rear wheels greater, when the slip suppressing condition determiner section determines that the suppressing condition is met, than when the slip suppressing condition determiner section determines that the suppressing condition is not met; and
    buffer devices provided to correspond to the front and rear wheels, respectively, wherein
    the load distribution changing section is an attitude changing section which changes an attitude of the vehicle around a pitching axis during driving of the vehicle;
    the load distribution control section controls the attitude changing section to change the attitude of the vehicle in a direction to increase the ground load of the one of the front and rear wheels; and
    the attitude changing section changes characteristics of the buffer devices to change the attitude of the vehicle.

2. The control system in the straddle-type vehicle according to claim 1,
    wherein the slip suppressing condition determiner section determines that the suppressing condition is met based on a slip state of the one of the front and rear wheels during acceleration or braking of the vehicle; and
    wherein the load distribution control section changes the characteristic of the buffer device corresponding to the one of the front and rear wheels to cause the buffer device to be contracted more easily or to cause the buffer device corresponding to the other of the front and rear wheels to be contracted less easily, when the slip suppressing condition determiner section determines that the suppressing condition is met, than when the slip suppressing condition determiner section determines that the suppressing condition is not met.

3. The control system in the straddle-type vehicle according to claim 1,
    wherein the load distribution control section changes the characteristics of the buffer device corresponding to at least a drive wheel of the front and rear wheels.

4. The control system in the straddle-type vehicle according to claim 1,
    wherein the load distribution control section changes how to change the characteristics of the buffer device based on a driving state of the vehicle.

5. The control system in the straddle-type vehicle according to claim 1, wherein the slip suppressing condition determiner section determines that the suppressing condition is met, when the straddle-type vehicle is driving in a predetermined driving state.

6. The control system in the straddle-type vehicle according to claim 1, wherein the buffer devices include a front fork or cushion unit.

7. A control system in a straddle-type vehicle including front and rear wheels, comprising:
- a load distribution changing section which changes a ground load distribution between the front and rear wheels during the driving of the vehicle;
- a slip suppressing condition determiner section which determines whether or not a suppressing condition used to suppress a slip of one of the front and rear wheels is met, during driving of the vehicle;
- a load distribution control section which controls the load distribution changing section to make the ground load of the one of the front and rear wheels greater, when the slip suppressing condition determiner section determines that the suppressing condition is met, than when the slip suppressing condition determiner section determines that the suppressing condition is not met; and
- a slip control section which adjusts a force applied in a rotational direction to each of the front and rear wheels during acceleration or braking of the straddle-type vehicle to suppress a slip of the wheel;
- wherein the slip suppressing condition determiner section determines that the suppressing condition is met, in association with control executed by the slip control section.

8. The control system in the straddle-type vehicle according to claim 7,
- wherein the load distribution control section and the slip control section are constituted by separate control units, respectively.

9. A method of controlling a straddle-type vehicle including a load distribution changing section which changes a ground load distribution between front and rear wheels during driving of the straddle-type vehicle, comprising:
- during driving of the vehicle, controlling the load distribution changing section to make a ground load of one of the front and rear wheels greater, regardless of adjusting a force in a rotational direction to be applied to the wheels, when a suppressing condition used to suppress a slip of the one of the front and rear wheels is met, than when the suppressing condition is not met.

* * * * *